United States Patent
Uchida

[11] Patent Number: 5,961,379
[45] Date of Patent: *Oct. 5, 1999

[54] TOOL GRINDING MACHINE

[75] Inventor: Kazuyuki Uchida, Ebina, Japan

[73] Assignee: Amada Metrecs Company, Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/671,587

[22] Filed: Jun. 28, 1996

Related U.S. Application Data

[63] Continuation of application No. 08/206,613, Mar. 7, 1994, Pat. No. 5,558,560.

[51] Int. Cl.⁶ .................................................. B24B 5/00
[52] U.S. Cl. .............................. 451/269; 451/24; 451/5; 451/173; 451/398; 294/91
[58] Field of Search .............................. 451/5, 9, 11, 14, 451/24, 119, 143, 145, 173, 388, 392, 393, 396, 460, 559, 914, 918, 269; 83/174; 269/46, 43, 127; 254/7 B, 100–103, 126; 414/222; 294/91

[56] References Cited

U.S. PATENT DOCUMENTS

| | | | |
|---|---|---|---|
| 1,298,662 | 4/1919 | Chadwick | 294/91 |
| 1,385,435 | 7/1921 | Dunn | 294/91 |
| 1,643,283 | 9/1927 | Bisbee et al. | 294/91 |
| 1,654,866 | 1/1928 | Davis | 294/91 |
| 1,991,958 | 2/1935 | Romaine | 451/396 |
| 2,079,323 | 5/1937 | Kokotiak . | |
| 2,142,710 | 1/1939 | Bigelow . | |
| 2,244,806 | 6/1941 | Schmidt . | |
| 3,147,657 | 9/1964 | Williamson . | |
| 4,048,889 | 9/1977 | Finley . | |
| 4,575,969 | 3/1986 | Klingel et al. . | |
| 4,661,912 | 4/1987 | Imanishi . | |
| 4,897,967 | 2/1990 | Maruyama et al. . | |
| 4,971,292 | 11/1990 | Craig | 254/7 R |
| 5,092,539 | 3/1992 | Caero | 254/102 |
| 5,127,293 | 7/1992 | Chatham . | |
| 5,176,057 | 1/1993 | Chun et al. . | |
| 5,267,384 | 12/1993 | Teeslink . | |
| 5,444,348 | 8/1995 | Garrec | 254/126 |

*Primary Examiner*—Robert A. Rose
*Assistant Examiner*—George Nguyen
*Attorney, Agent, or Firm*—Blank Rome comisky & McCauley LLP

[57] ABSTRACT

A tool grinding machine which can grind the cutting edge of a punch without disassembling the punch body from the punch assembly and further can grind the cutting edge of the upper surface shoulder portion of the die. Further, the punch and die of various shapes can be ground easily by selecting an appropriate previously stored operation mode determined according to grinding conditions. The tool grinding machine includes a rotary table 33 rotatably disposed on a slider 29 supported on a base 3 movable in the right and left direction; and a grinding tool 53 disposed axially away from the rotary table and rotatable and movable in an axial direction of the rotary table 33, for grinding workpiece fitted on the rotary table 33.

2 Claims, 20 Drawing Sheets

TOOL GRINDING MACHINE

This is a continuation of application Ser. No. 08/206,613, filed Mar. 7, 1994, U.S. Pat. No. 5,558,560.

BACKGROUND OF THE INVENTION

1. Field of the Invention

The present invention relates to a tool grinding machine for grinding cutting edges of tools (punch and die, in particular) by which a sheet metal can be processed.

2. Description of the Prior Art

Conventionally, a punch press such as turret press for punching a sheet metal, for instance is so far well known. In the punch press, various punches and dies are used to punch a sheet metal into various shapes.

When workpiece is punched out by use of these punches and dies, since the cutting edges of these punches and the dies are worn off or damaged as a matter of course, the processing precision is deteriorated. Therefore, whenever the worker notices the damage of the punches and the dies, the cutting edges thereof must be grounded for further use.

In the known grinding machines for grinding the cutting edges of punches and dies, punches and dies are fixed to a fixed workpiece table, and a grinding stone head having a rotating grinding stone is moved in the right and left direction and further in the upper and lower direction; or else a grinding stone head having the rotatable grinding stone is fixed, and the workpiece table is moved in the right and left direction and further in the upper and lower direction.

In the conventional grinding machines as described above, however, when the cutting edge of a punch is required to be ground, for instance, there exists a problem in that a punch body must be disassembled or removed from a punch assembly and in addition the removed punch body must be assembled with the punch assembly after grinding.

Further, when the cutting edge of a die is ground, although the upper surface of the die can be ground easily, since the rounded edge formed at the upper surface shoulder portion must be ground manually by the worker after the die upper surface has been ground, thus causing a problem in that time and labor are required.

Further, as the typical shapes of the punch and the die, although there are various shapes such as convex type, concave type, convex shear type, concave shear type, etc,. since the grinding conditions differ according to the shapes, the worker must change the grinding conditions on all such occasions before grinding the punch and die, so that there exists a problem in that the grinding workpiece is troublesome.

SUMMARY OF THE INVENTION

With these problems in mind, therefore, it is the object of the present invention to provide a tool grinding machine by which the cutting edge of punch can be ground without disassembling the punch body from the punch assembly; the rounded edge of the die upper surface shoulder portion can be ground easily; and the punches and the dies of any shapes can be ground easily by selecting an appropriate operation mode previously determined according to various grinding conditions.

To achieve the above-mentioned object, the present invention provides a tool grinding machine, comprising: a rotary table disposed on a base; and a grinding tool disposed axially away from said rotary table and rotatable and movable in an axial direction of said rotary table, for grinding workpiece fitted on said rotary table.

In the tool grinding machine, said grinding tool is a circular grinding stone having an outer circumference extending to roughly a center of said rotary table and disposed at a position eccentrically away from an axis of said rotary table, the workpiece being located and fixed at roughly the central position of said rotary table.

Further, the tool grinding machine further comprises: a punch supporting device disposed on said rotary table, for supporting a punch assembly having a punch guide, a punch body and an elastic stripper member; and a push device disposed on said punch supporting device, for projecting an end of the punch body from the punch guide against an elastic force of the elastic stripper member.

The push device preferably includes a hydraulic cylinder. In this application, the "hydraulic cylinder" includes a air cylinder.

Further, the tool grinding machine further comprises an auxiliary grinding arm disposed on the base and having a grinding tool attached at an end thereof so as to be movable between a position at which the grinding tool is in contact with an appropriate position of the workpiece and another position at which the grinding tool is located away from the workpiece.

Further, the tool grinding machine further comprises a contact sensor interposed between an end of the workpiece attached on said rotary table, and the grinding tool so as to be movable into and away from the end of the workpiece; and a lifter device for moving the punch assembly mounted on the push device in vertical direction. Further, the push device is switchable from a status where the punch body is pushed against the elastic member of the punch assembly to a status where the punch assembly can be removably mounted on the punch support device or vice versa. Further, the punch supporting device comprises a ring-shaped flange member removably attached to said rotary table, the flange member having a surface adapted to contact a flange portion of the punch guide of the punch assembly. The contact surface may be inclined with respect to an axis of said rotary table.

Further, the present invention provides a tool grinding machine, comprising: a rotary table disposed on a base; a lift slider disposed vertically movably, for rotatably supporting a grinding tool to grind an upper surface of workpiece fitted to said rotary table; and a hook attached to said lift slider, for moving the workpiece to be exchanged up and down relative to said rotary table.

Further, the present invention provides a tool grinding machine, comprising: a rotary table disposed on a base; a lift slider movable in an axial direction of said rotary table, for rotatably supporting a grinding tool to grind an upper surface of workpiece fitted to said rotary table; a contact sensor adapted to be removably inserted between the grinding tool and the workpiece while contacting both members; a contact detecting section for detecting a status where said contact sensor is inserted between the grinding tool and the workpiece, said contact detecting section being activated when detecting the above status; a storing section for storing position of said lift slider, as an original position, when said contact detecting section is activated; and a control section for controlling position of said lift slider on the basis of the original position of said lift slider stored in said storing section.

Further, the present invention provides a tool grinding machine, comprising: a rotary table disposed on a base; a lift slider movable in an axial direction of said rotary table, for rotatably supporting a grinding tool to grind an upper surface of workpiece fitted to said rotary table; a control section for controlling operation of said lift slider; a selecting section for selecting whether the workpiece is a punch or a die; a processing condition data storing section for previously storing processing condition data corresponding to the punch and the die; and a data transferring section for reading the processing condition data of the punch or die selected by said selecting section from said processing condition data storing section and further transferring the read data to said control section.

In the tool grinding machine according to the present invention, the slider is moved in the right and left direction on the base, and further the rotary table is disposed on the slider. Further, a grinding tool is disposed axially away from the rotary table so as to be rotatable and movable in the axial direction of the rotary table. Accordingly, when the punch or the die (as the workpiece) is attached on the rotary table and then the rotary table is rotated and further moved in the right and left direction and when the grinding stone is rotated and then brought into contact with the workpiece, it is possible to grind the workpiece (the punch or the die).

Further, since the punch supporting device for supporting the punch assembly is mounted on the rotary table and further a push device for pushing the punch body of the punch assembly supported by the punch supporting device is provided on the rotary table, it is possible to grind the workpiece without disassembling the punch assembly.

Further, since the auxiliary grinding arm is provided on the base, it is possible to grind the rounded edge of the upper surface shoulder portion of the die by a grinding tool attached to an end of the auxiliary arm.

Further, since the selecting section can select the punch or the die, it is possible to grind the punch or die easily in accordance with the previously determined grinding conditions.

DETAILED DESCRIPTION OF THE PREFERRED EMBODIMENTS

The embodiments of the tool grinding machine according to the present invention will be described hereinbelow with reference to the attached drawings. These embodiments of the tool grinding machine are particularly used for grinding a punch and a die for a punch press.

Figure 1:
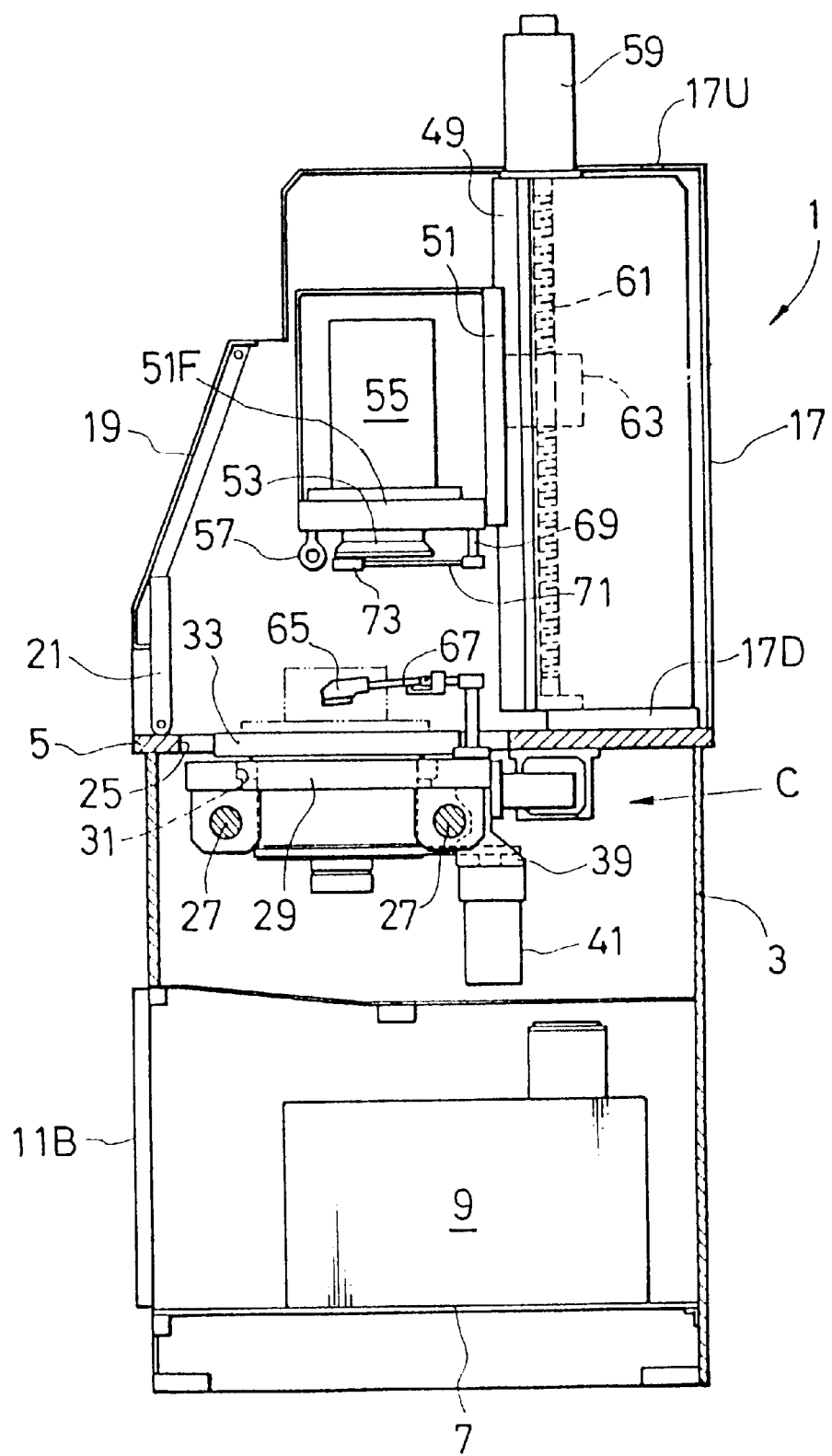
FIG. 1 is a side view showing a first embodiment of the tool grinding machine according to the present invention.
Figure 2:
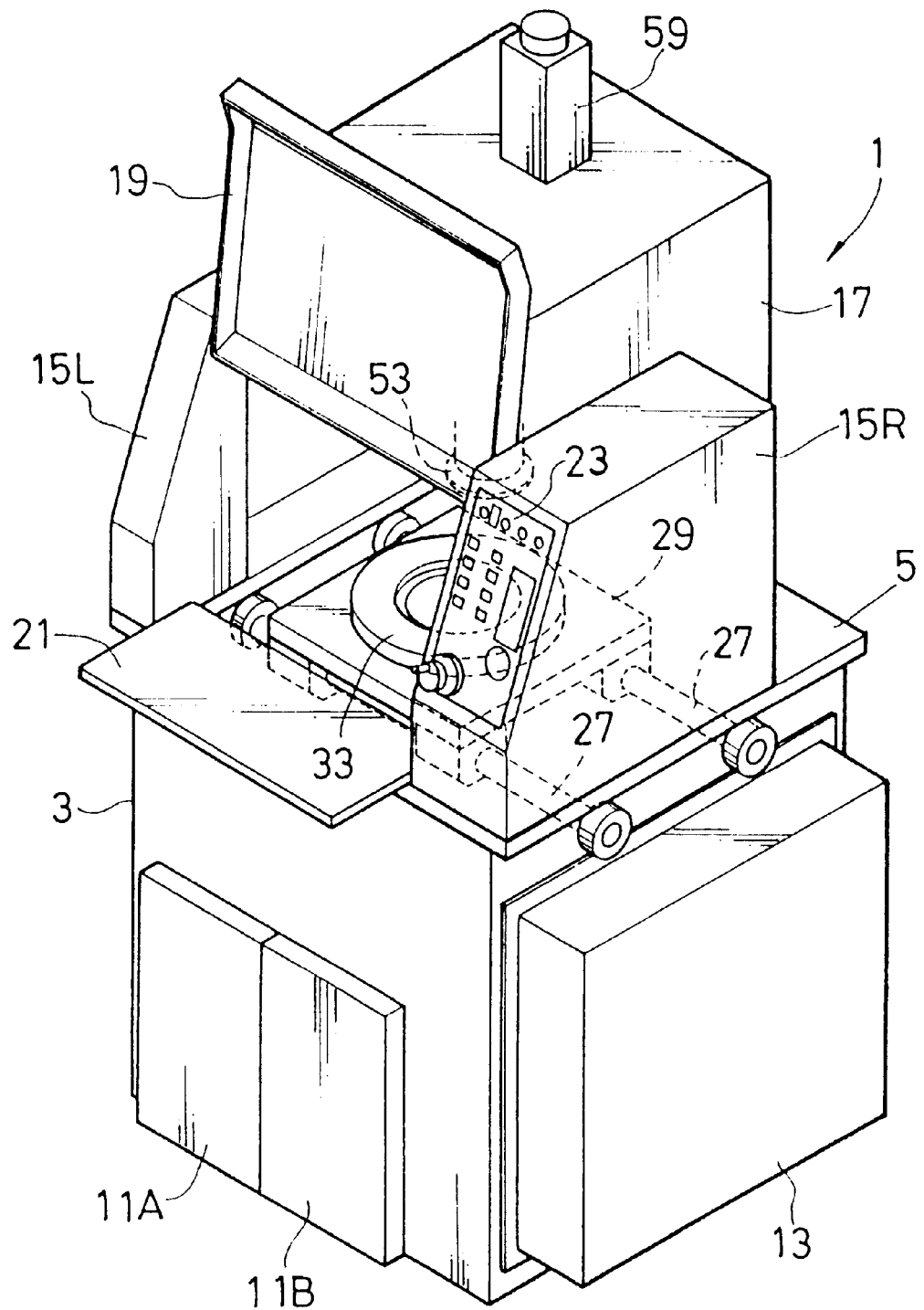
FIG. 2 is a perspective view showing the same tool grinding machine shown in FIG. 1.

In FIGS. 1 and 2, the tool grinding machine 1 is provided with a box-shaped bed 3 as a base. On this bed 3, a support table 5 is mounted. In a lower frame 7 which constitutes a part of the bed 3, a coolant accommodating box 9 for accommodating a coolant (grinding liquid) is disposed.

On the front surface of the bed 3, two openable doors 11A and 11B are provided so that the coolant accommodating box 9 disposed in the lower frame 7 within the bed 3 can be put in or out. Further, on the right side surface of the bed 3, a power board 13 for actuating the tool grinding machine 1 is mounted.

On both sides of the support table 5, two side frames 15R and 15L are vertically disposed. An upper box 17 is disposed between the two side frames 15R and 15L and on the support table 5.

To the front side of the upper box 17, an upper cover 19 pivotal in the upward direction and a lower cover 21 pivotal in the downward direction are pivotally linked. When pivoted in the downward direction as shown in FIG. 2, this lower cover 21 serves as a workpiece table on which a tool such as punch or die or a jig can be placed. Further, on the front surface of the side table 15R, a console panel 23 is arranged.

The support table 5 is formed with a rectangular hole 25. Under this hole 25 and between the right and left walls of the bed 3, two parallel guide members 27 spaced in the front and rear direction are supported so as to extend in the right and left direction. To the guide members 27, a horizontally movable slider 29 is fitted so as to be movable in the right and left direction.

This slider 29 is formed with a circular hole 31 at a central portion thereof. To this hole 31, a rotary table 33 is fitted. Further, the slider 29 is formed with a rack on the rear side thereof so as to extend in the right and left direction. A motor having a pinion in mesh with this rack is mounted on the support table 5, for instance.

In the construction as explained above, when the motor is driven to rotate the pinion, the slider 29 is moved via the rack in mesh with the pinion and guided by the guide members 27.

Figure 3:
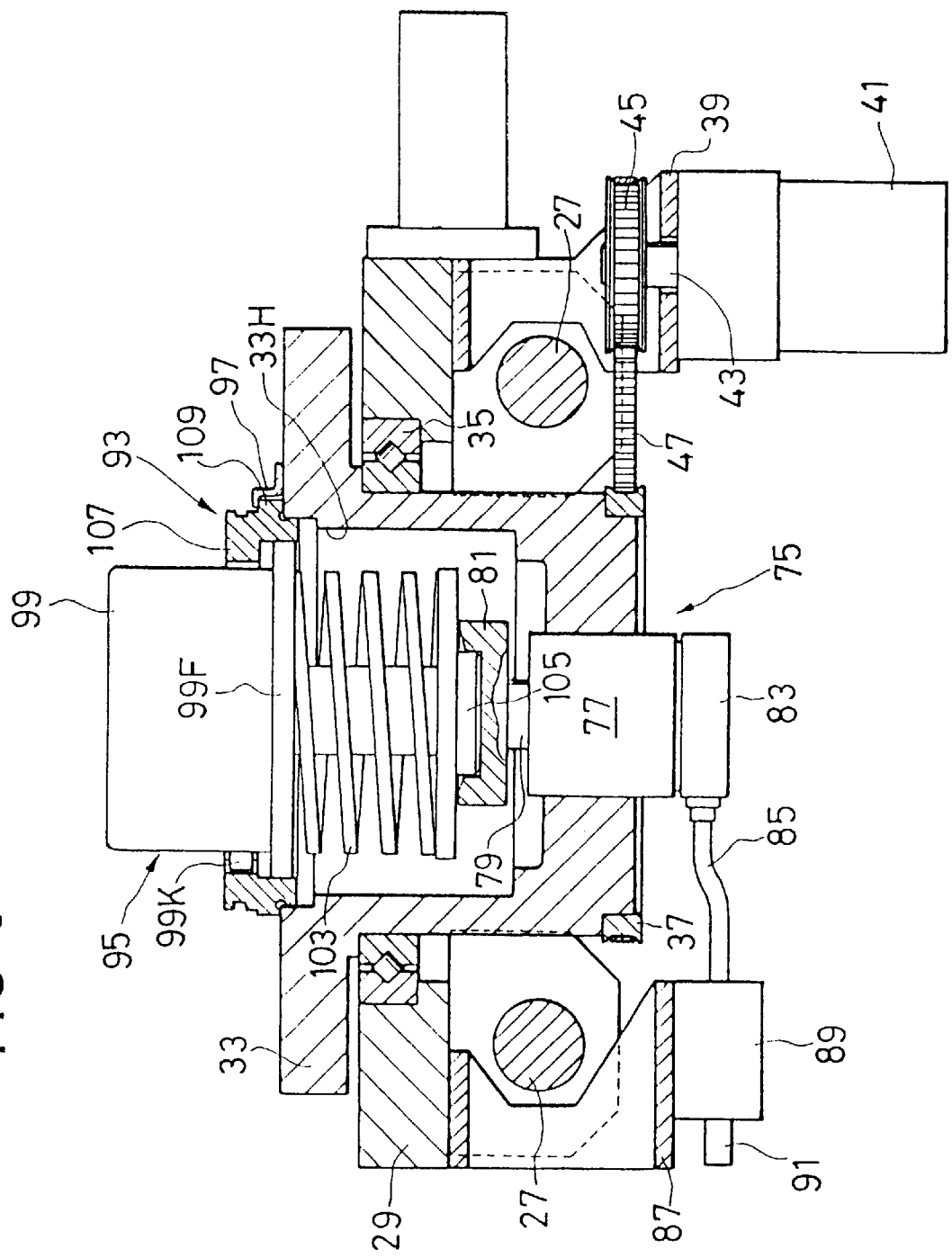
FIG. 3 is an enlarged cross-sectional view showing a status in which a punch assembly is supported on a rotary table, when seen in an arrow direction C in FIG. 1.

As shown in FIG. 3, a rotary table 33 is supported via a bearing 35 fitted to the hole 31 formed in the slider 29. A pulley 37 is attached to the lower portion of the rotary table 33. Further, in FIGS. 1 and 3, on the right side and lower portion of the slider 29, a drive motor 41 is mounted via a bracket 39. A drive pulley 45 is fixed to an output shaft 43 of the drive motor 41. A belt 47 is reeved around the drive pulley 45 and the pulley 37, respectively.

In the construction as described above, when the drive motor 41 is driven, the drive pulley 45 is rotated via the output shaft 43, so that the drive pulley 45 is rotated and thereby the rotary table 33 is rotated by the belt 47 and the pulley 37.

With reference to FIG. 1 again, a plurality of parallel guide rails 49 spaced in the right and left direction are provided on the upper box 17 so as to extend in the vertical direction. A lift slider 51 is fitted to the guide rail 49 and further a cup-shaped rotatable grinding stone 53 (as a grinding tool) is supported at a lower portion of a lower frame 51F of the lift slider 51. Further, on the lower frame 51F, another drive motor 55 is mounted. The cup-shaped grinding stone 53 is fitted to an output shaft of the drive motor 55. At the front lower portion of the lower frame 51F, a hook 57 for lifting a punch or die (as a workpiece) is disposed.

On an upper frame 17U of the upper box 17, a lift motor 59 is mounted. An upper portion of a ball screw 61 extending in the vertical direction is linked to an output shaft of this lift motor 59. A lower portion of the ball screw 61 is supported by a lower frame 17D of the upper box 17 via a bearing. A nut member 63 geared with the ball screw 61 is formed integral with the lift slider 51.

In the construction as described above, when the drive motor 55 is driven, the cup-shaped grinding stone 53 is rotated. When the lift motor 59 is driven, the ball screw 61 is rotated, so that the lift slider 51 is moved up and down via the nut member 63. Accordingly, the cup-shaped grinding stone can be moved up and down while rotating.

At the end of the slider 29, an auxiliary grinding arm 67 having a grinding tool 65 is provided. It is also possible to dispose this auxiliary grinding arm 67 on the bed 3. Further, on the right side (in FIG. 1) of the lower frame 51F of the lift slider 51, a post 69 extending in the vertical direction is attached so as to be movable up and down. A rear end of a horizontal arm 71 pivotal on a horizontal plane is pivotally supported at the lower portion of the post 69. A contact sensor 73 is attached to the end portion of the horizontal arm 71. It is also possible to pivotally support this contact sensor 73 on the bed 3 via a bracket.

As shown in FIG. 3, a push device 75 is provided at the lower portion of the rotary table 33. A hydraulic cylinder such as air cylinder 77 for constituting a part of this push device is mounted at the lower axial portion of the rotary table 33. A piston rod 79 is fitted to this hydraulic cylinder 77, and a concave punch receive portion 81 is formed integral with the upper end of the piston rod 79.

At the lower portion of the hydraulic cylinder 77, a rotary joint 83 is provided. One end of a pipe 85 is connected to the rotary joint 83. The other of this pipe 85 is connected to a hydraulic pressure generating device 89 mounted on the lower portion of the slider 29 via a bracket 87. This hydraulic pressure generating device 89 is provided with a handle 91.

In the construction as described above, when the handle 91 is rotated in one direction with a wrench, for instance, a hydraulic pressure is supplied from the hydraulic pressure generating device 89 to the hydraulic cylinder 77 through the pipe 85 and the rotary joint 83, so that the punch receive portion 81 is lifted via the piston rod 79. Further, when the handle 91 is rotated in the other direction, the hydraulic pressure is released from the hydraulic cylinder 77, so that the punch receive portion 81 is lowered.

Further, in the above-mentioned embodiment, although the hydraulic pressure generating device 89 is attached on the lower portion of the slider 29 via a bracket, it is also possible to mount this hydraulic pressure generating device 89 on the support table 5 or the rotary table 33.

Figure 4:
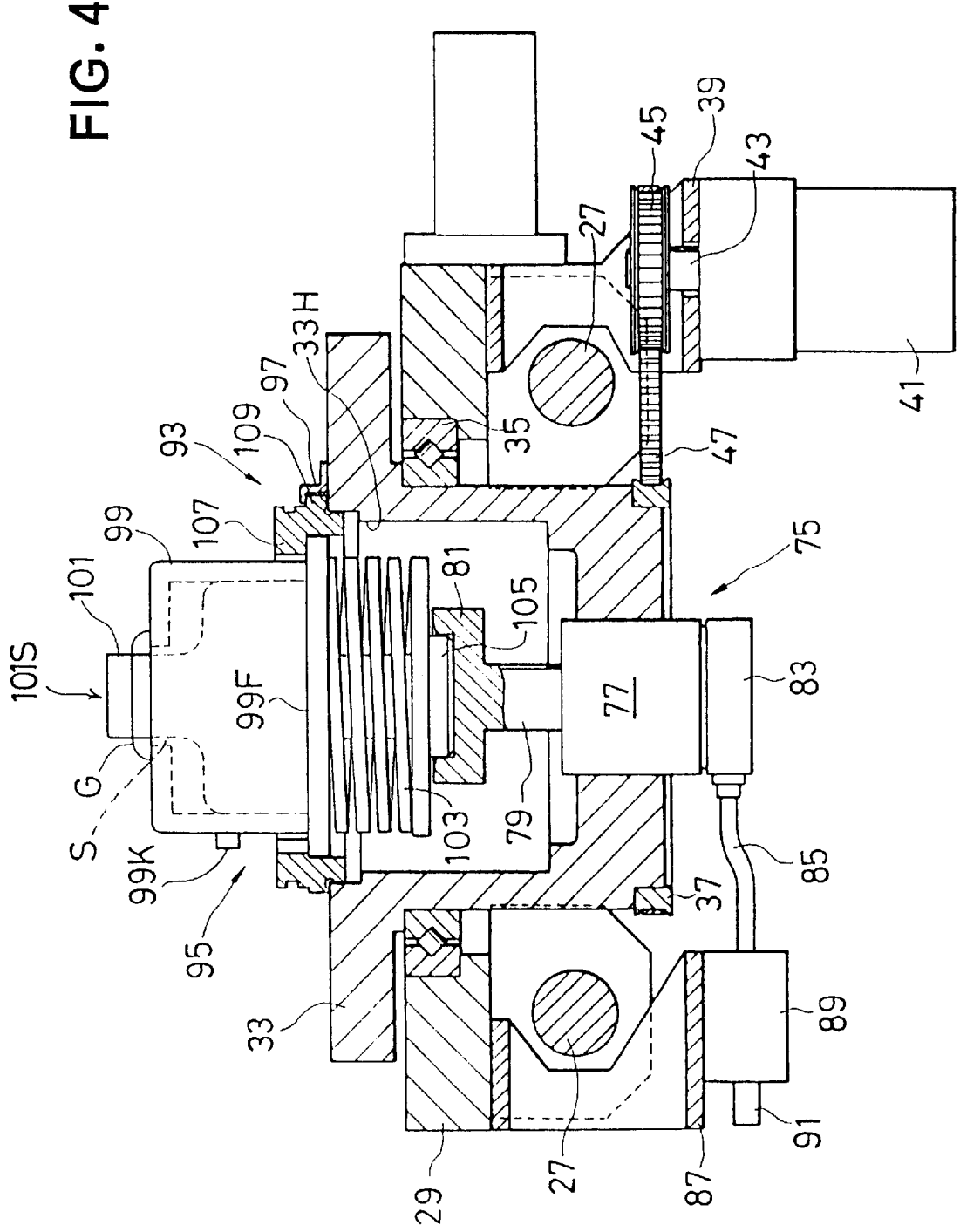
FIG. 4 is an enlarged cross-sectional view showing a status in which a cutting edge of a punch body of the punch assembly projects from a punch guide in FIG. 3.
Figure 5:
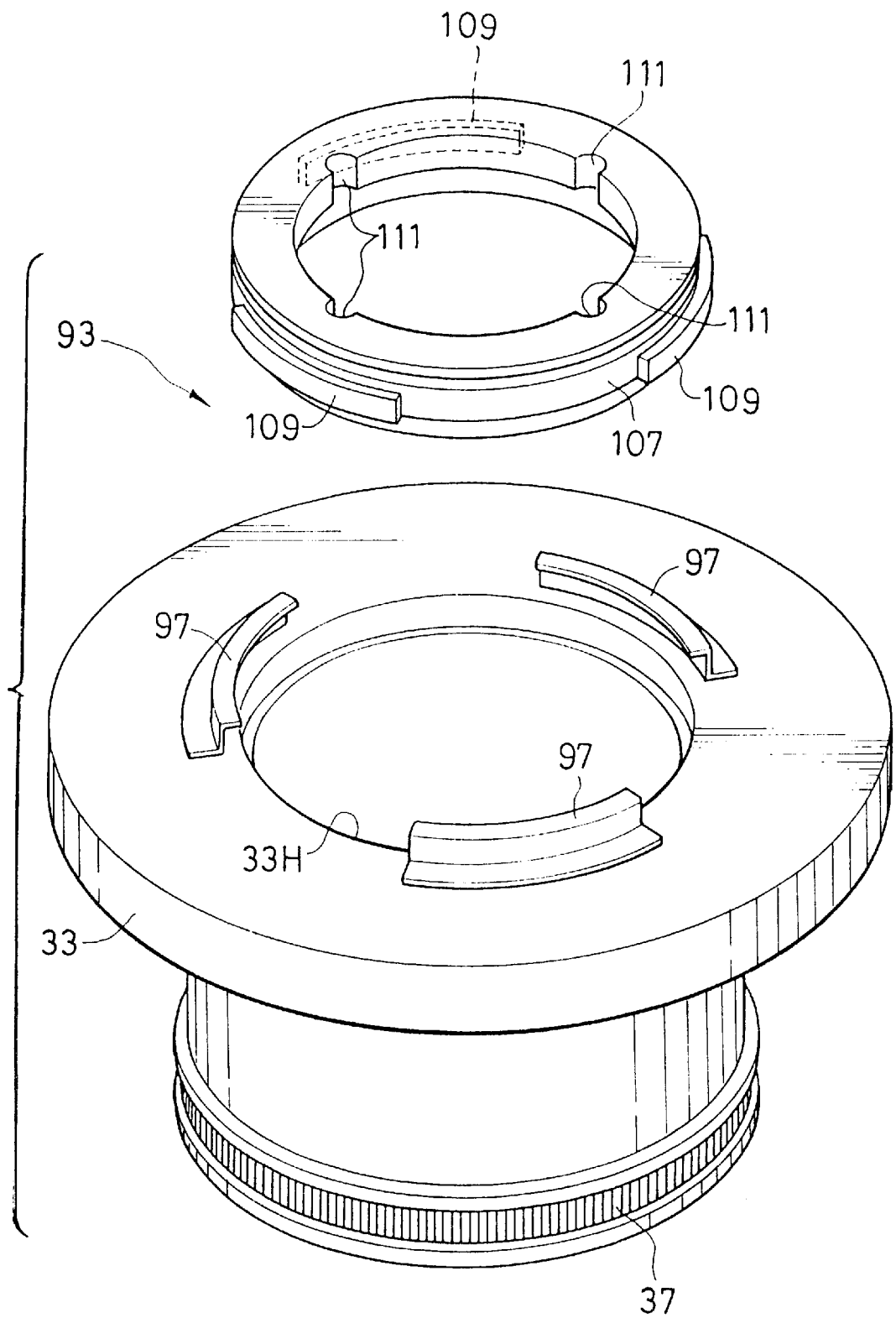
FIG. 5 is a perspective view showing a punch supporting device for supporting the punch assembly on the rotary table in FIG. 3.

As shown in FIGS. 3 to 5, a punch support device 93 is provided on the rotary table 33. The rotary table 33 is formed with a hole 33H (into which a punch assembly 95 can be inserted) at the axial portion thereof. Near the outer circumference of the hole 33H and on the circumferential surface of the rotary table 33, a plurality (three, in this embodiment) of engage members 97 are provided at appropriate angular intervals.

The punch assembly 95 is composed of a punch guide 99, a punch body 101, an elastic stripper member 103, and a punch head 105, etc.

On the outer circumferential portion of a ring member 107 fitted to the hole 33H of the rotary table 33, a plurality (three, in this embodiment) of engage members 109 are arranged at appropriate angular intervals. Further, on the inner circumferential surface of the ring member 107, grooves 111 (see FIG. 5) engageable with keys 99K (see FIG. 3) of the punch guide 99 are formed at regular angular intervals (e.g., 90 degrees).

In the construction as described above, the punch assembly 95 is reversed up side down, and inserted into the hole 33H of the rotary table 33 to mount a punch head 105 on the punch receive portion 81. Under these conditions, a ring member 107 as a part of the punch support device 93 is fitted to the punch guide 99. In this case, keys 99K of the punch guide 99 are engaged with the groove III of the ring member 107. When the ring member 107 is fastened, the engage members 109 are engaged with the engage members 97, so that it is possible to support the punch assembly 95 by the rotary table, as shown in FIG. 3.

Under these conditions, when the hydraulic pressure generating device 89 is actuated, the piston rod 79 of the hydraulic cylinder 77 is lifted, so that the punch receive portion 81 is moved upward and thereby the flange portion 99F of the punch guide 99 is brought into contact with the flange surface of the ring member 107. When the punch receive portion 81 is further lifted, the punch body 101 is further lifted against an elastic force of the elastic stripper member 103, so that the punch body 101 is lifted being projected from the punch guide 99, as shown in FIG. 4.

Under these conditions, when the rotary table 33 is rotated and the cup-shaped grinding stone 53 is rotated and further lowered, it is possible to grind the upper surface 101S of the punch cutting edge (the top end) of the punch body 101.

Further, as shown in FIG. 4, under the condition that the cutting edge of the punch body 101 projects from the punch guide 99, since a gap S is produced between the punch guide 99 and the punch body 101, it is preferable to cover the outer circumference of the punch cutting edge with an elastic member G (e.g., made of a rubber) to prevent chip produced during grinding from entering the inside of the punch guide 99 through this gap S.

In the case where the punch cutting edge is circular, it is possible to grind the side surface of the punch cutting edge by moving the slider 29 in the right and left direction and rotating the rotary table 33 under the condition that the side surface of the punch cutting edge is in contact with the side surface of the cup-shaped grinding stone 53.

Figure 6:
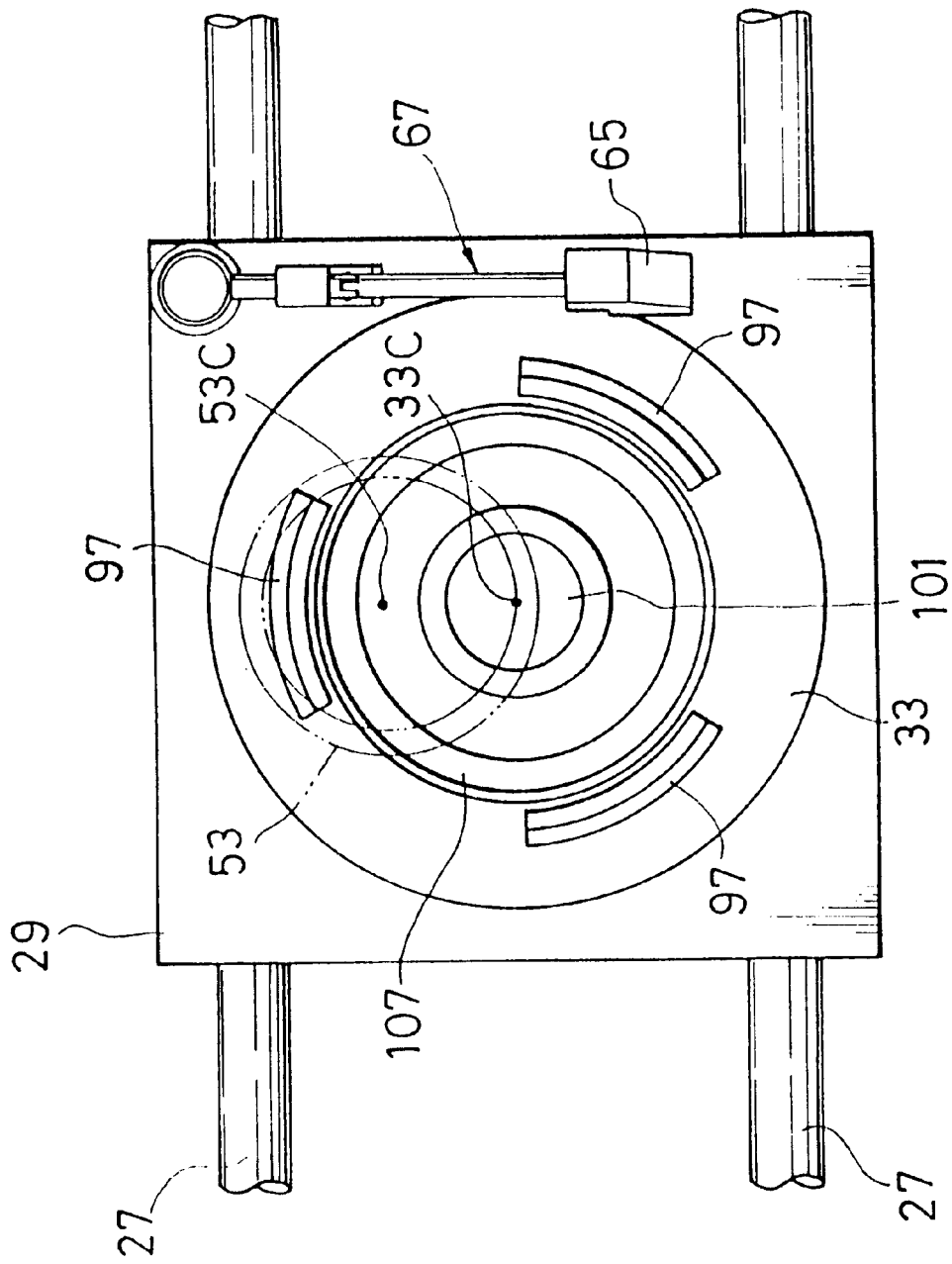
FIG. 6 is a plan view showing the positional relationship between the rotary table and a cup-shaped grinding stone.

As depicted in FIG. 6, the axial portion 33C of the rotary table 33 is located eccentrically from the center 53C of the cup-shaped grinding stone 53. Further, the radius (outer circumferential portion) of the cup-shaped grinding stone 53 is determined to be slightly larger than the radius of the axial portion 33C of the rotary table 33. Therefore, when the punch assembly 95 or the die (described later) is set at the axial portion 33C of the rotary table 33, it is possible to grind the set tool by only rotating the rotary table 33 and the cup-shaped grinding stone 53 and by further moving the cup-shaped grinding stone 53 up and down.

Figure 7:
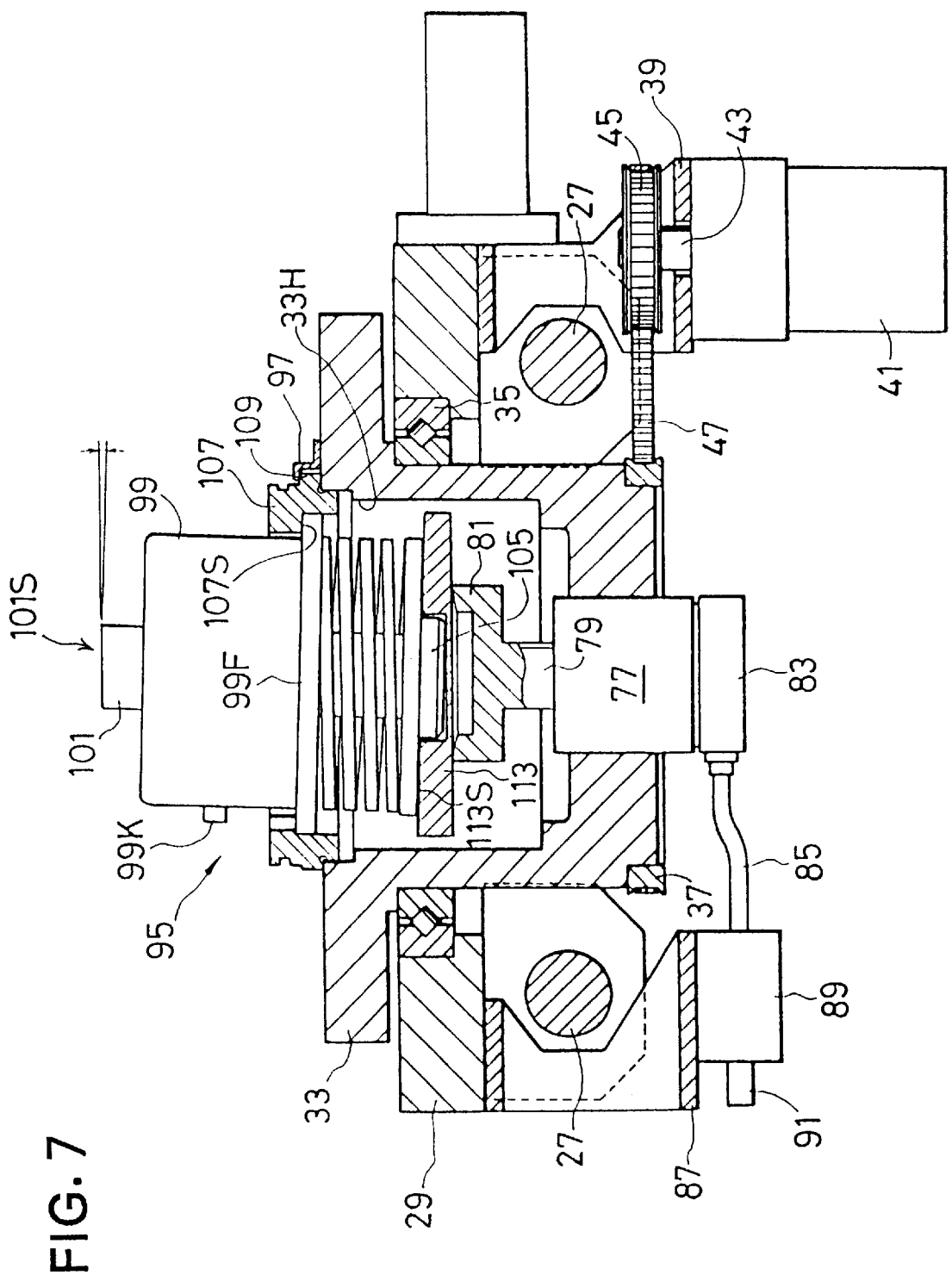
FIG. 7 is an enlarged cross-sectional view showing a status in which the punch assembly having an inclined cutting edge in the punch body is supported on the rotary table.

Further, as shown in FIG. 7, when the end of the punch body 101 of the punch assembly 95 has a shear angle, an inclination plate 113 having an inclination surface 113S inclined at an angle the same as the shear angle is placed on the punch receive portion 81, and the punch head 105 is fitted to the concave portion of the inclination plate 113. Further, since the flange 99F of the punch guide 99 is fitted under inclination condition, a ring member 107 having an inclined surface 107S is used to support the punch cutting edge horizontally. Accordingly, it is possible to grind the upper and side surfaces of the punch cutting edges by the cup-shaped grinding stone 53.

Figure 8:
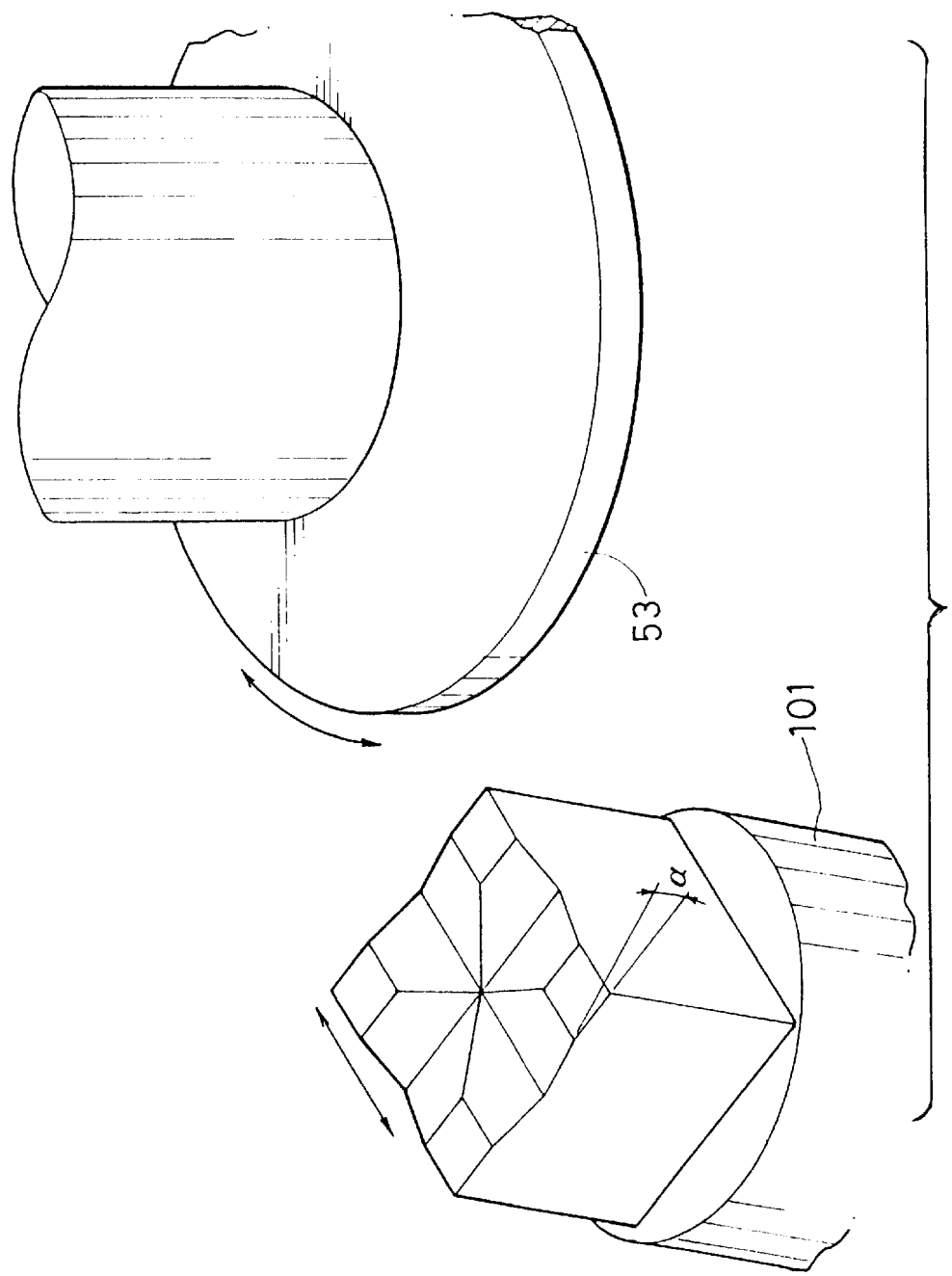
FIG. 8 is a perspective view showing a status in which cutting edges of the punch body formed with V grooves are ground by the cup-shaped grinding stone.

Further, as shown in FIG. 8, when the punch cutting edge has a shear angle a, the inclination plate 113 as already explained is mounted on the punch receive portion 81. Under the condition that the portion having the shear angle is set horizontally, it is possible to grind the end portion having a shear angle by moving the slider 29 in the right and left direction and by rotating the cup-shaped grinding stone 53 clockwise and counterclockwise in the arrow directions in FIG. 8.

Figure 9:
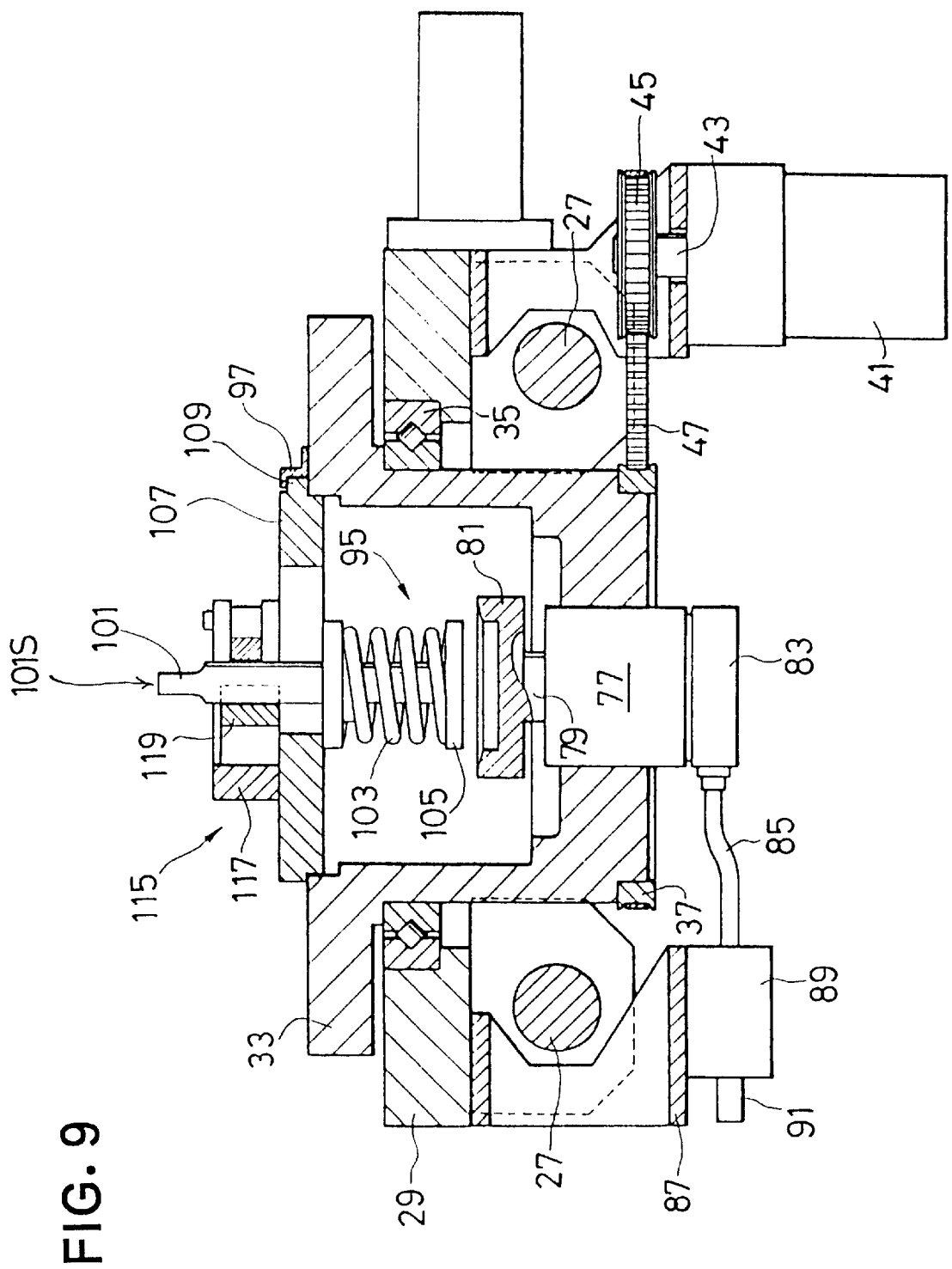
FIG. 9 is an enlarged cross-sectional view showing a status in which the punch assembly having no punch guide is supported on the rotary table.
Figure 10:
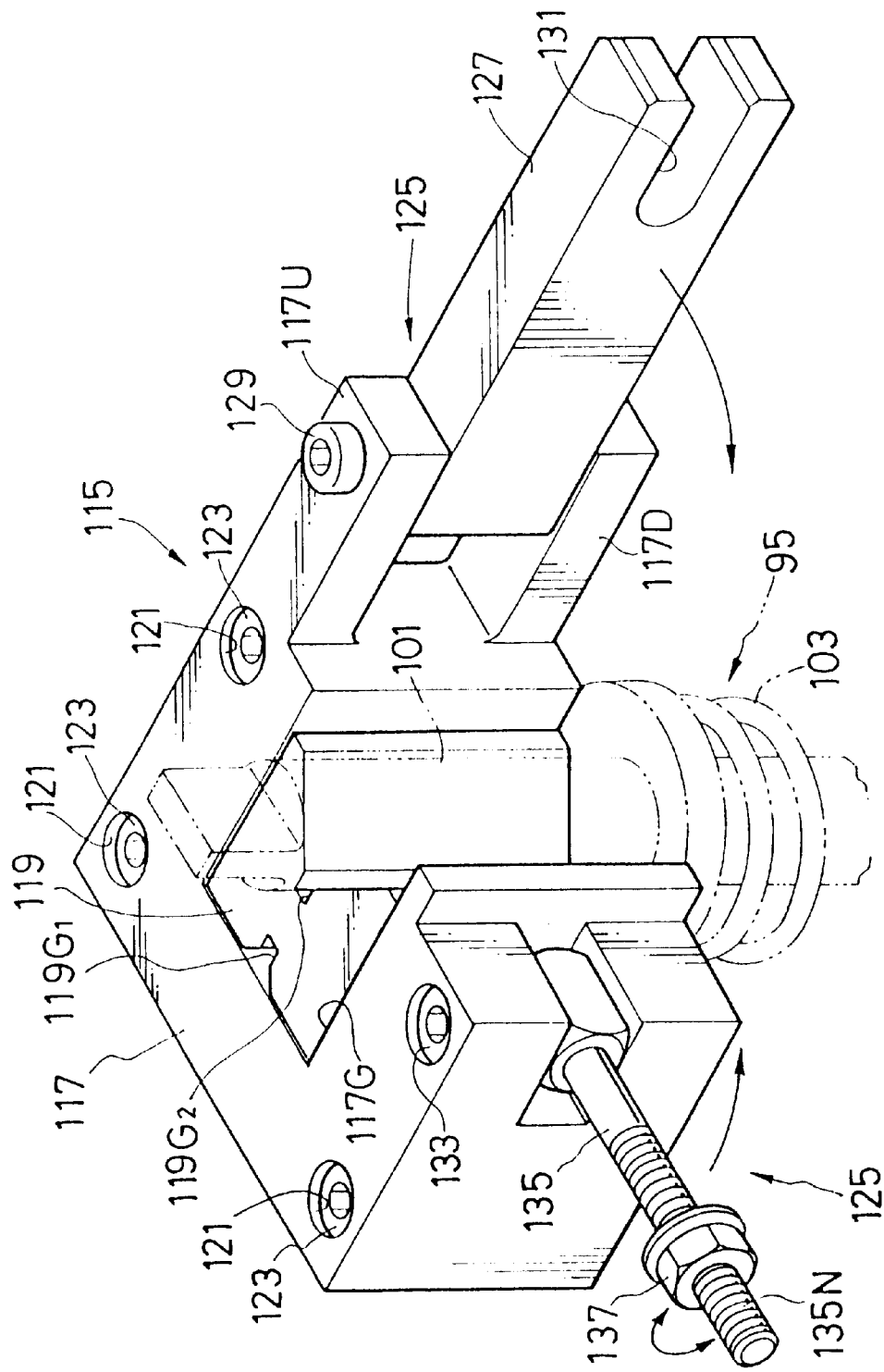
FIG. 10 is a perspective view showing a punch support jig for supporting the punch body in FIG. 9.

Further, as shown in FIGS. 9 and 10, when the punch body 101 is exposed outside without having the punch guide 99 of the punch assembly 95, the outer circumferential portion of the punch body 101 is gripped by a punch support jig 115 as shown in FIG. 10, and the gripped punch body 101 is placed on the ring member 107. Further, the engage members 109 of the ring member 107 are engaged with the engage members 97 to support the punch body 101.

As shown in FIG. 10, the punch support jig 115 is provided with a U-shaped block holder 117 and a support block 119. The support block 119 is formed with a plurality (two in two opposing surfaces, in this embodiment) of V-shaped engage grooves 119G1 and 119G2 of different sizes. The support block 119 is disposed in a concave groove 117G of the block holder 117. Further, a plurality of holes 121 are formed at the corners of the block holder 117. The block holder 117 is fixed to the ring member 107 by use of bolts 123 inserted into these holes 121.

A fastening member 125 for fastening the support block 119 and the punch body 101 of the punch assembly 95 against the concave groove 117G is attached to the block holder 117. In more detail, an end portion of a fastening arm 127 is pivotally supported by a pin 129 between the two upper and lower projecting portions 117U and 117D formed at one corner of the block holder 117. Further, the fastening arm 127 is formed with a U-shaped groove 131 at an end thereof.

On the opposite side of the projecting portions 117U and 117D of the block holder 127, an end of a fastening bolt 135 is pivotally supported by a pin 133. The fastening bolt 135 is formed with a male thread portion 135N (with which a nut 137 is engaged) at one end portion thereof.

In the construction as described above, as shown in FIG. 10, under the conditions that the support block 119 is engaged with the concave groove 117G of the block holder 117 and further the punch body 101 of the punch assembly 95 is brought into contact with the engage groove 119G1 or 119G2 of the support block 119, the fastening arm 127 is pivoted by about 90 degrees about the pin 129 in the arrow direction in FIG. 10.

Thereafter, the fastening bolt 135 is pivoted by about 90 degrees about the pin 133 in the arrow direction in FIG. 10 to engage the fastening bolt 135 with the groove 131 of the fastening arm 127. Under these conditions, when the nut 137 is fastened along the male thread portion 135N, the punch body 101 is fixed to the support block 119. In this status, since the block holder 117 is fixed to the ring member 107 with a plurality of bolts 123, it is possible to obtain the status as shown in FIG. 9.

Under these conditions, when the rotary table 33 is rotated and further the cup-shaped grinding stone 53 is rotated and moved up and down, it is possible to grind the upper surface 101S of the cutting edge of the punch body 101.

Further, it is also possible to grind the side surface of the cutting edge of the punch body 101 by moving the slider 29 in the right and left direction and by rotating the cup-shaped grinding stone 53 on condition that the side surface of the cup-shaped grinding stone is in contact with the side surface of the cutting edge of the punch body 101.

Figure 11:
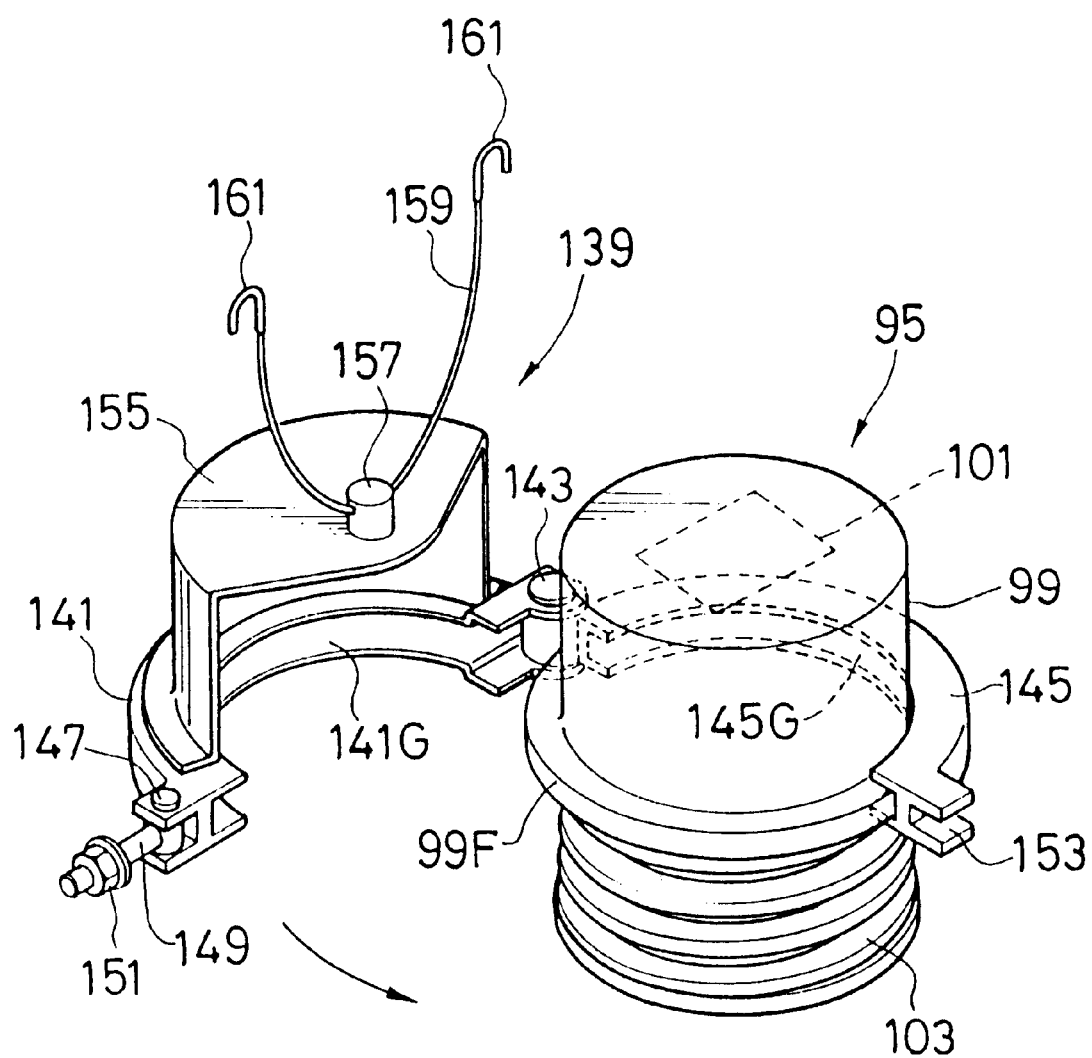
FIG. 11 is a perspective view showing a punch lifting device for lifting a large-diameter punch assembly.

When the punch assembly 95 is large in diameter and heavy, it is rather difficult for the worker to lift the punch assembly by his hands and further to insert the punch assembly into the hole 33H of the rotary table 33. In this case, a punch lift device 139 as shown in FIG. 11 is used.

In more detail, the punch lift device 139 is provided with a semi-circular block holder 141. This block holder 141 is formed with a semi-circular groove 141G in the inner circumferential surface thereof, to which the flange 99F of the punch guide 99 of the punch assembly 95 is fitted. On one end of the block holder 141, one end of a pivotal semi-circular fastening holder 145 is pivotally supported via a pin 143. The fastening holder 145 is also formed with a semi-circular groove 145G fitted to the flange portion 99F of the punch guide 99 in the inner circumferential surface thereof.

On the other end of the block holder 141, the rear end of the fastening bolt 149 is pivotally supported by a pin 147. A nut 151 is engaged with the fastening bolt 149. On the other hand, a U-shaped groove 153 is formed at the other end of the fastening holder 145.

On the block holder 141, a lunar-shaped support block 155 is formed integral with the block holder 141. A cylindrical mounting block 157 is disposed at the central portion of the support block 155. A hook wire 159 is passed through a hole formed in this mounting block 157. The hook wire 159 is bent into a U-shaped hook portion 161 on both ends thereof, respectively.

In the construction as described above, the worker brings up the large-diameter punch assembly 95 as shown in FIG.

11 by his hands and further mounts the punch assembly 95 on the lower cover 21 (used in common as the workpiece table) as shown in FIG. 2. Thereafter, the groove 145G of the fastening holder 145 of the punch lift device 139 as shown in FIG. 11 is fitted to the flange 99F of the punch guide 99.

Further, block holder 141 is pivoted about the pin 143 in the arrow direction to engage the groove 141G of the block holder 141 with the flange 99F of the punch guide 99. Further, the fastening bolt 149 is inserted into the groove 153 and then the nut 151 is fastened to fix the punch assembly to the punch lifting device 139.

The two hook portions 161 of both ends of the hook wire 159 are hooked to the hook portion 57 shown in FIG. 1. Under these conditions, when the lift slider 51 is moved upward to lift the punch lift device 139, the punch assembly 95 is once suspended in midair. Under these condition, when the lift slider 51 is moved downward, it is possible to insert the punch assembly 95 into the hole 33H of the rotary table 33, so that the punch head 105 can be mounted on the punch receive portion 81.

Under these conditions, after the punch lift device 139 is removed from the punch assembly 95, when the ring member 107 is so set as to be located on the outside of the punch guide 99, and further the engage portions 109 of the ring member 107 are engaged with the engage members 97, it is possible to obtain the status as shown in FIG. 3.

In the status as shown in FIG. 3, it is possible to grind the side surface of the upper end of the cutting edge of the punch guide 99 by the operation as already explained.

Figure 12:
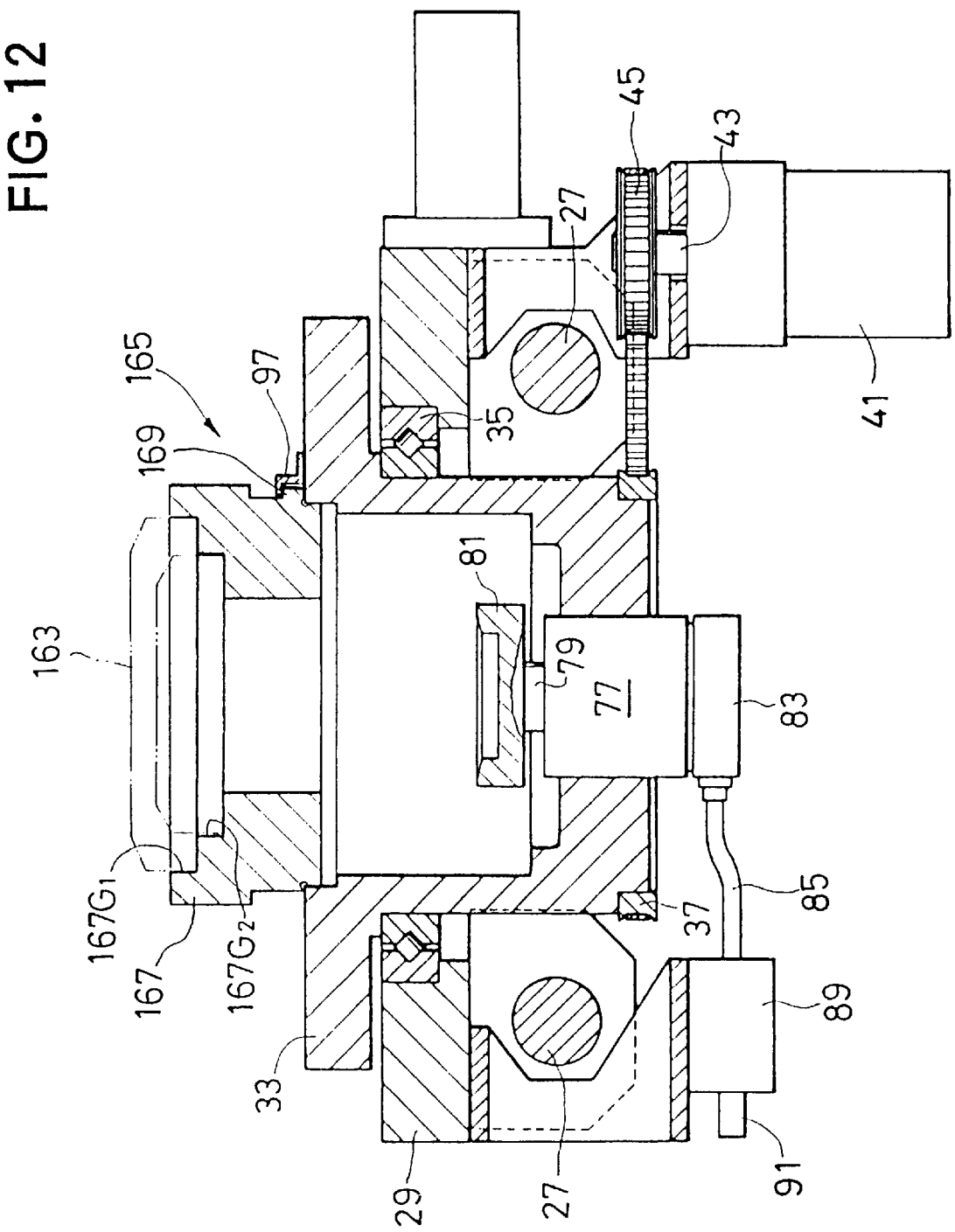
FIG. 12 is an enlarged cross-sectional view showing a status in which a die is supported on the rotary table.

In the case where the upper surface 163S of the die 163 is required to be ground, as shown in FIG. 12, a die supporting jig 165 engaged with the engage members 97 is used.

In more detail, the die supporting jig 165 is a ring member 167. The ring member 167 is formed with a plurality (three in this embodiment) of engage members 169 arranged at regular angular intervals on the outer circumference of the ring member 167. The die 163 can be fixed to the rotary table 33 by engaging the engage members 169 with the engage members 97, respectively.

Further, a plurality (two in this embodiment) of stepped engage grooves 167G1 and 167G2 are formed at the central portion of the ring member 167, to which various dies 163 of different sizes can be fitted selectively.

In the construction as described above, under the conditions that the die 163 is engaged with the engage groove 167G1 or 167G2, it is possible to grind the upper surface 163 S of the die 163 by rotating the rotary table 33 and further by rotating and moving downward the cup-shaped grinding stone 53.

Figure 13:
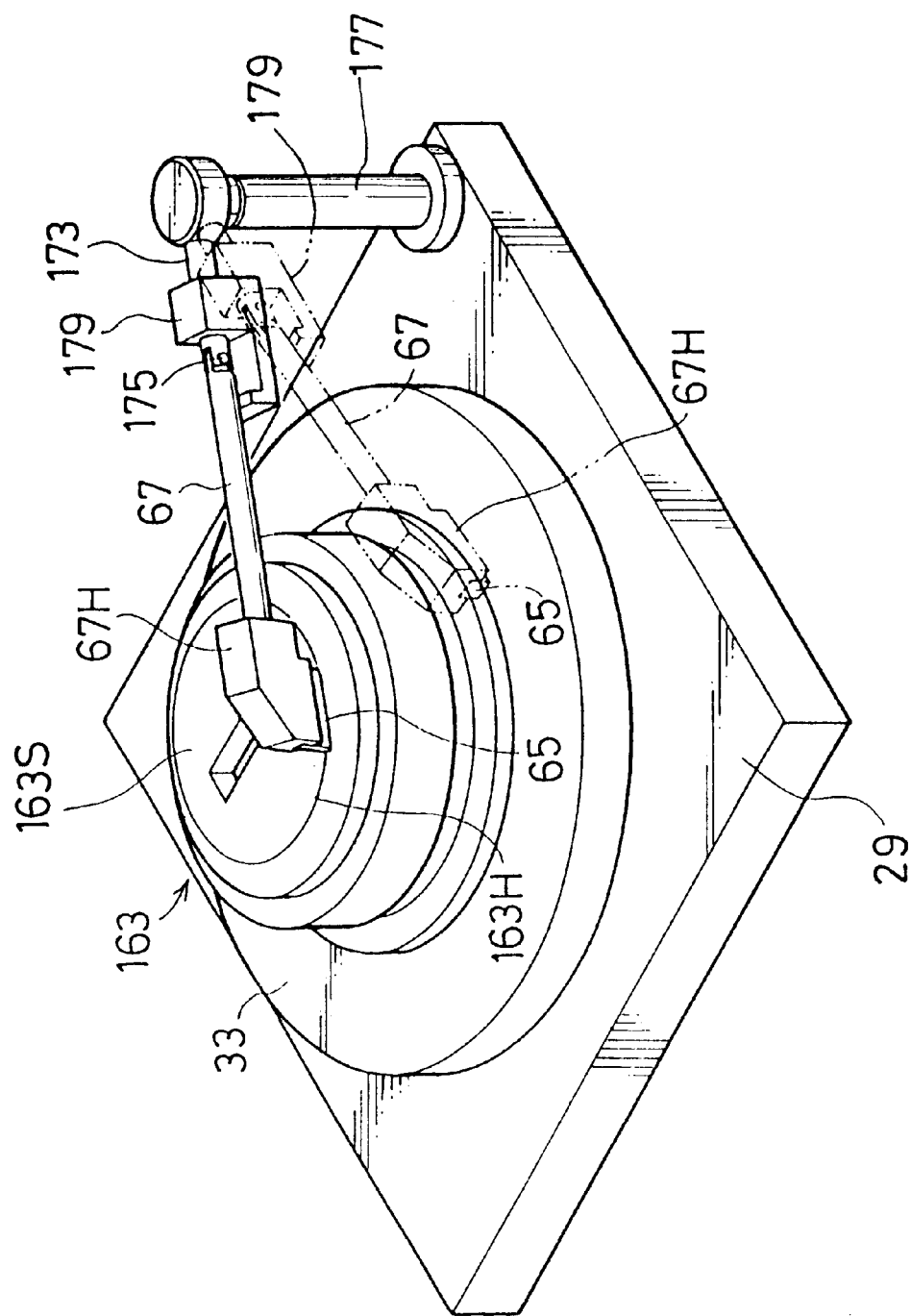
FIG. 13 is a perspective view showing a status in which a rounded edge portion of the upper surface shoulder portion of the die is polished by a grinding tool provided at an end of an auxiliary grinding arm.

As shown in FIG. 13, after the grinding of the upper surface 163S of the die 163, the edge portion 163H of the upper end shoulder portion of the die 163 can be ground and rounded by a grinding tool 65 attached to an end of the auxiliary grinding arm 67. In more detail, the auxiliary arm 67 is supported at a rear end thereof by a rod 173 via a pin 175 so as to be pivotal vertically. The rear portion of the rod 173 is supported at a rear end thereof by a vertical post 177 disposed at a corner of the slider 29 so as to be pivotal horizontally. Further, a support fixing block 179 is disposed to support the auxiliary grinding arm 67 to the rod 173.

In the construction as described above, when the edge portion of the upper surface shoulder portion 163H of the die 163 is required to be ground and rounded, in FIG. 13, the rotary table 33 on which the die 163 is mounted is rotated.

Under these conditions, the worker brings up the head portion 67H of the auxiliary grinding arm 67 located at a rest position as shown by dot-dot-dashed lines, moves the head portion 67H in the horizontal direction to a position as shown by solid lines, and further moves up and down the head portion 67H thereof, so that it is possible to grind (chamfer) the edge portion of the upper surface shoulder portion 163H of the die 163 by the grinding tool 65.

Figure 14:
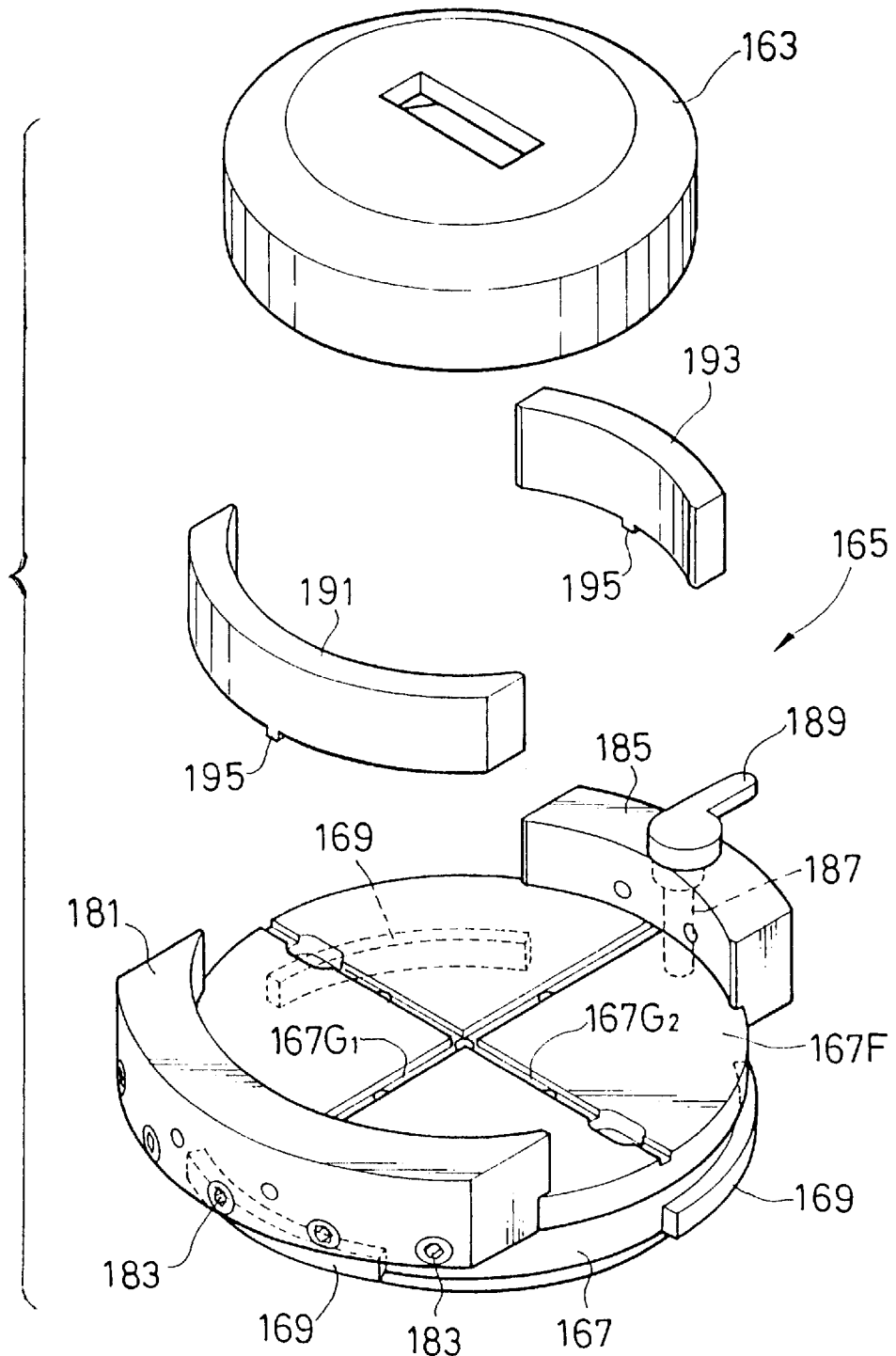
FIG. 14 is a perspective view showing a die supporting jig for supporting a die.

FIG. 14 shows another embodiment of the die supporting jig. In this embodiment, the ring member 167 is formed with a flange 167F on the upper portion thereof integrally therewith. On the upper surface of this flange 167F, two cross-shaped grooves 167G1 and 167G2 are formed. Further, a circular arc-shaped block holder 181 is fixed on the outer circumference of the flange 167F and on one outer side of the groove 167G1 with a plurality of bolts 183.

Further, a circular arc-shaped fixing block 185 is fixed on the outer circumference of the flange 167F and on the other outer side of the groove 167G1 with a plurality of bolts (not shown). An eccentric axle 187 is attached to this fixed block 185, and in addition a handle 189 is fitted to the upper portion of the eccentric axle 187.

In the construction as described above, when a die 163 whose diameter is roughly the same as a circle formed between the inner circumference of the block holder 181 and the inner circumference of the fixed block 185 is required to be mounted between the block holder 181 and the fixed block 185, the handle 189 is first pivoted. Then, since the eccentric axle 187 is pivoted, it is possible to mount and fix the die 163 on and to the ring member 167 by use of the eccentric axle 187.

Under these conditions, when engage members 169 of the ring member 167 are engaged with the engage members 97 of the rotary table 33, the die 163 can be set to the rotary table 33. Further, when the rotary table 33 is rotated and simultaneously the rotating cup-shaped grinding stone 53 is lowered, it is possible to grind the upper surface 163S of the die 163.

When the diameter of the die 163 is smaller than a circular formed between the inner circumference of the block holder 181 and the inner circumference of the fixed block 185, two circular arc-shaped spacers 191 and 193 as shown in FIG. 14 are additionally used. That is, the two projections 195 of the respective spacers 191 and 193 are engaged with the grooves 167G1 and the outer circumferences of the spacers are brought into contact with the inner circumferences of the block holder 181 and the fixed block 185, respectively. Further, the die 163 is fitted between the spacers 191 and 193 and in addition the eccentric axle 187 is pivoted to fix the die 163. Under these conditions, the upper surface 163S of the die 163 can be ground in the same way.

Accordingly, it is possible to fit and fix the die 163 of various sizes by preparing spacers 191 and 193 according to the size of the dies 163 or by using other spacers.

Figure 15:
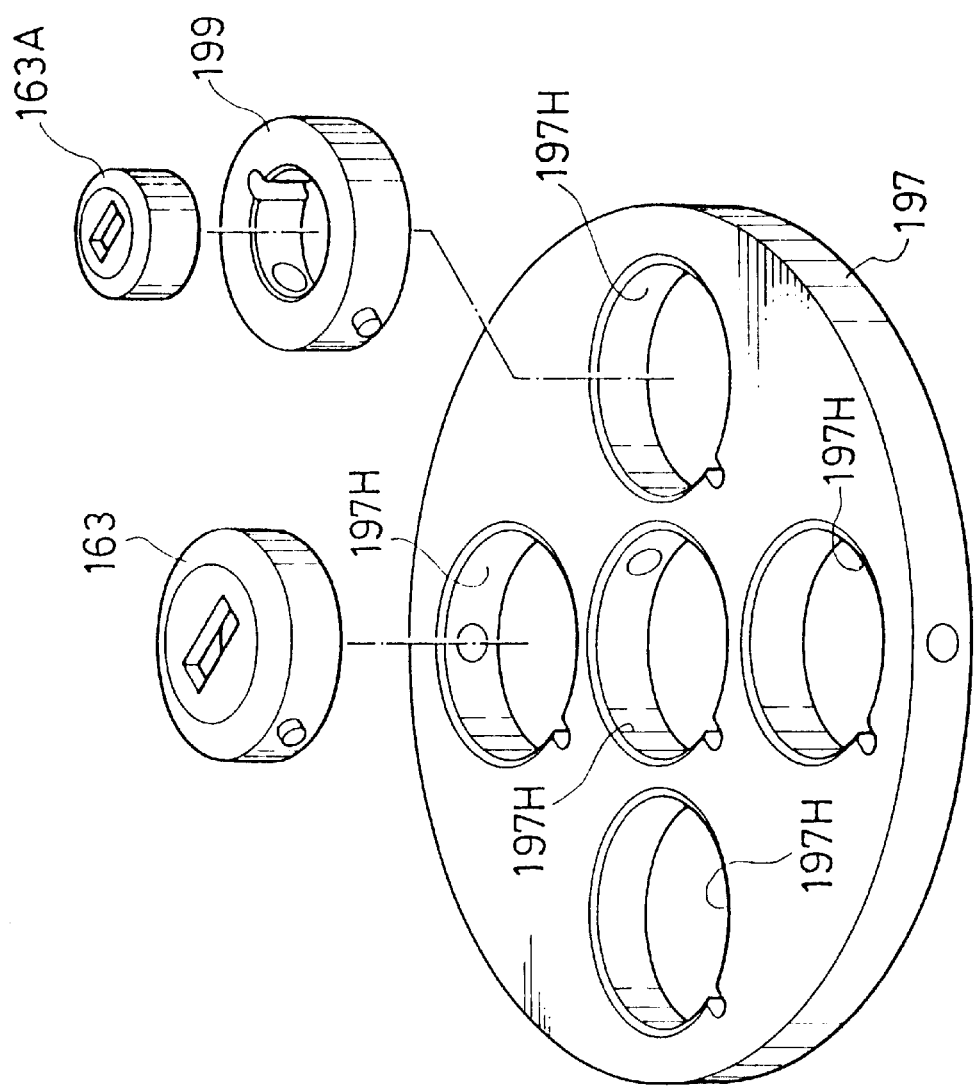
FIG. 15 is a perspective view showing another die supporting plate on which a plurality of small-diameter dies are mounted.

FIG. 15 shows another die supporting jig. When the size of the die 163 is relatively small, a plurality (e.g., five) fitting holes 197H are formed in a die support plate 197 and further the dies 163 are fitted to the fitting holes 197H, respectively. Further, the die support plate 197 is fitted between the block holder 181 and the fixed block 185 as shown in FIG. 14 and then the eccentric axle 187 is pivoted to fix the die support plate 197 to the die supporting jig 165. Under these conditions, it is also possible to grind the upper surfaces of a plurality of the dies 163 simultaneously.

When the diameter of a die 163A is further smaller than that of the die 163, an adapter ring member 199 is further fitted to the hole 197H of the die support plate 197 and further the die 163A is fitted to this adapter ring member 199 for grinding.

Figure 16:
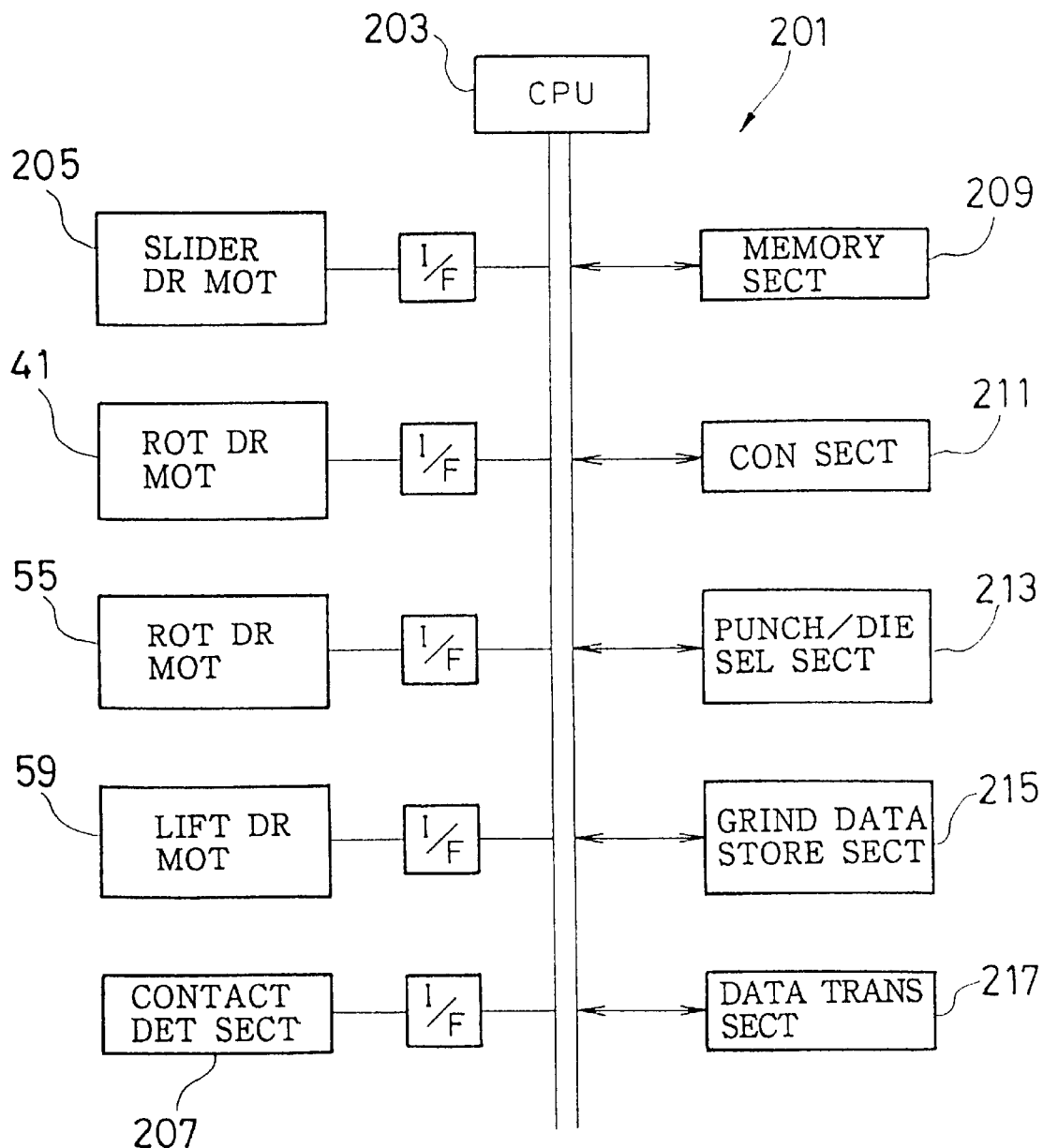
FIG. 16 is a block diagram showing a control apparatus for controlling the tool grinding machine.

With reference to FIG. 16, a control apparatus 201 for controlling the tool grinding machine numerically (NC control) is connected to the console panel 23 shown in FIG. 2. In more detail, the control apparatus 201 is provided with a CPU 203. To this CPU 203, there are connected various motors such as a drive motor 205 for moving the slider 29 in the right and left direction, a drive motor 41 for rotating the rotary table 33, a drive motor 55 for rotating the cup-shaped grinding stone 53, and a drive motor 59 for lifting the lift slider 51. These motors are provided with an encoder, respectively. Further, a contact detecting section 207 is connected to the CPU 203 for electrically detecting the fitting conditions of the contact sensor 73 (shown in FIG. 1) between the cup-shaped grinding stone 53 and the punch body 101 or the upper surface 163S of the die 163. Further, a memory section 209 is connected to the CPU 203 to store a position of the lift slider of when the contact detecting section 207 is activated.

Further, a control section 211 is connected to the CPU 203 to control the position of the lift slider 51 on the basis of the original position (stored in the memory section 209) or to control the vertical motion of the lift slider 51. Further, there are connected to the CPU 203 other sections such as a selecting section 213 for selecting a punch assembly 95 or a die 163 (as the workpiece), a grinding condition data storing section 215 for previously storing grinding condition data according to the punch assembly 95 and the die 163, and a data transfer section 217 for reading the grinding condition data of the punch assembly 95 or the die 163 selected by the selecting section 213 from the grinding condition data storing section 215 and further transferring the read data to the control section 211.

In the construction as described above, any one of the punch assembly 95 and the die 163 is mounted on and fixed to the rotary table 33. Further, the lift slider 51 is lowered and simultaneously the contact sensor 73 is pivoted and located from the rest position to a working position. Under the condition that the contact sensor 73 is interposed between the cup-shaped grinding stone 53 and the cutting edge of the punch assembly 95 or the die 163, the original position of the lift slider 51 is thus detected electrically by the contact detecting section 207. The detected original position of the lift slider 51 is stored in the storing section 209. Further, when the punch assembly 95 or the die 163 selected by the selecting section 213 is instructed to the grinding condition data storing section 215, the grinding condition data can be designated. The designated grinding condition data are transferred to the control section 211 by the data transfer section 217 in order to control the slider drive motor 205, the drive motors 41 and 55 and the drive motor 59, respectively. In more detail, various grinding conditions are controlled, for instance such as a stroke of the slider 29 in the left and right direction, the rotational speed of the rotary table 33, a stroke and moving speed of the lift slider 51 (a quick motion to the original position but a slow motion thereafter), the rotational speed of the cup-shaped grinding stone 53, etc., in order to grind the upper or side surface of the cutting edge of the punch assembly 95 or the upper surface of the die 163 automatically.

As described above, in the tool grinding machine according to the present invention, it is possible to grind the punch assembly 95 automatically under the condition that the cutting edge of the punch body 101 is projected from the punch guide 99 without disassembling the punch assembly 95. In addition, it is possible to grind the punch assembly 95 and the die 163 easily and simply by changing the jig according to the size of the punch assembly and the die.

In the embodiment described with reference to FIGS. 1 to 16, after the punch assembly 95 has been inserted into the hole 33H of the rotary table 33 up side down to mount the punch head 105 on the punch receive portion 81, the hydraulic cylinder 77 of the push device 75 is actuated to lift the punch body 101 relative to the punch guide 99 so that the punch cutting edge (the end of the punch body 101) can be projected. In the above-mentioned construction, however, when a heavy punch assembly 95 is required to be set, it takes time and labor.

Figure 17:
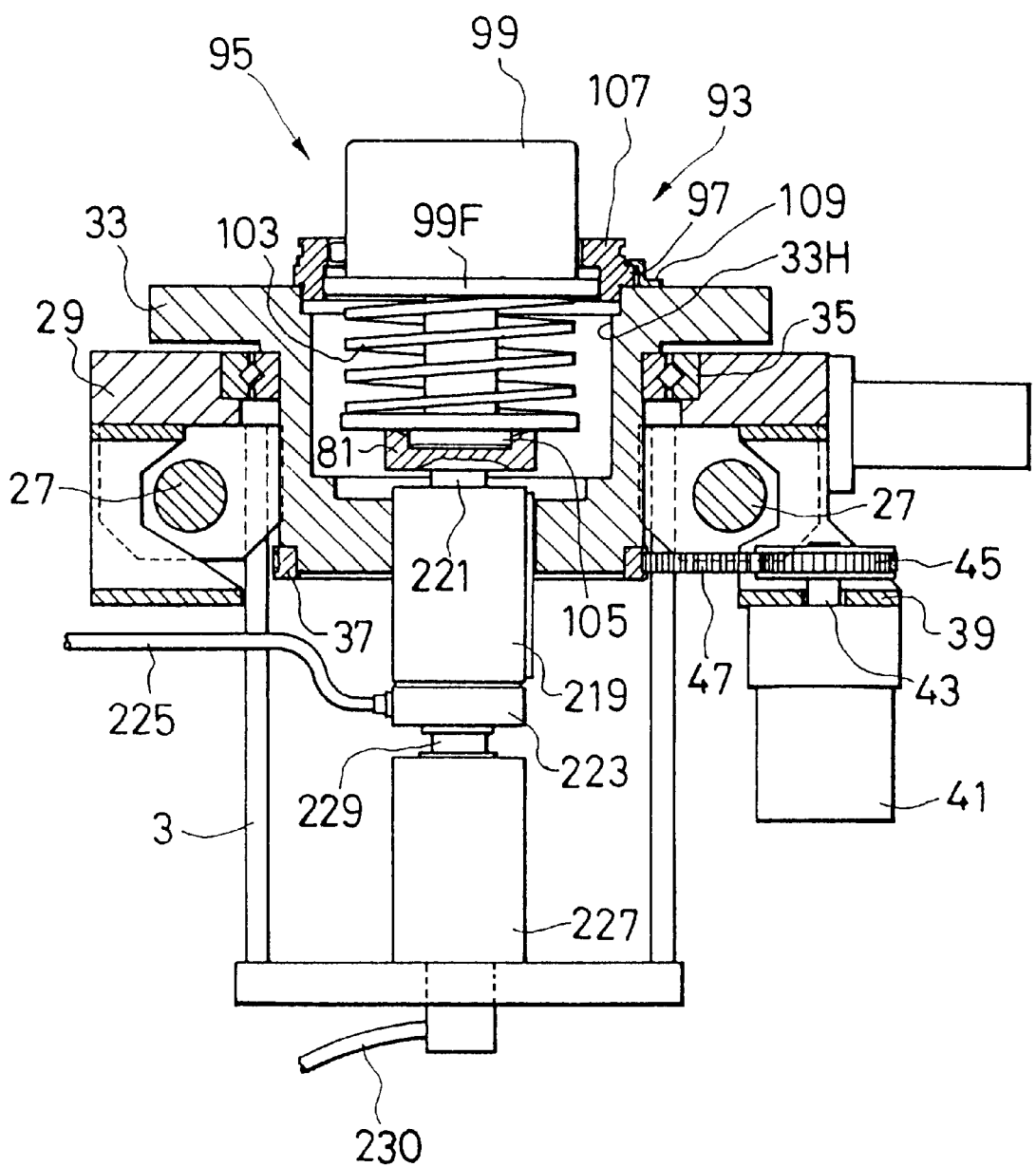
FIG. 17 is an enlarged cross-sectional view showing another embodiment of the tool grinding machine in which the punch assembly is set to the rotary table.

FIG. 17 shows another construction which can overcome the above-mentioned problem. In FIG. 17, a push cylinder 219 is provided at the lower axle portion of the rotary table 33 as a part of the push device 75. Further, a recessed punch receive portion 81 is formed on the upper portion of and integral with a piston rod 221 fitted to the cylinder 219.

A rotary joint 223 is provided at the lower portion of the push cylinder 219. One end of a pipe 225 is connected to this rotary joint 223 and the other end of the pipe 225 is connected to the source of pressurized fluid (not shown).

Further, in FIG. 17, a lift cylinder 227 is provided in the bed 3 to project the punch receive portion 81 beyond the rotary table 33. An upper end of a piston rod 229 fitted to the lift cylinder 227 is located at the lower portion of the rotary joint 223. One end of a pipe 230 is connected to the lift cylinder 227 and the other end of the pipe 230 is connected to the source of pressurized fluid (not shown).

Figure 18:
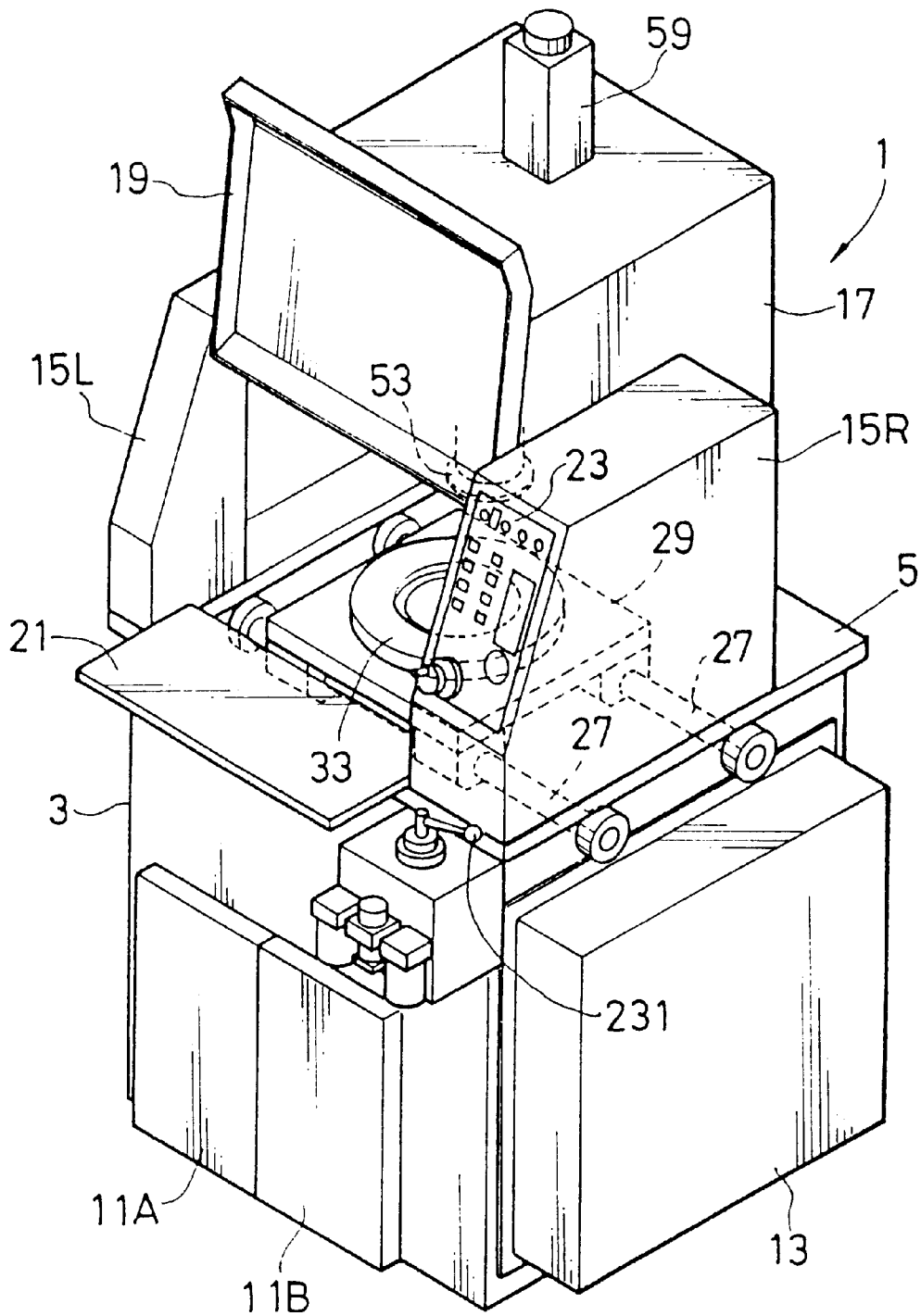
FIG. 18 is a perspective view showing an example of the tool grinding machine in which an operation handle for actuating hydraulic cylinders is provided on a front side of the machine.

As shown in FIG. 18, an operation handle 231 is disposed on the front side of the bed 3 to actuate the push cylinder 219 and the lift cylinder 227, respectively. For instance, when this handle 231 is pivoted to a position A, both the push cylinder 219 and the lift cylinder 227 are not actuated; when pivoted to a position B, only the push cylinder 219 is actuated and the lift cylinder 227 is not actuated; and when pivoted to a position C, the push cylinder 219 is not actuated and only the lifter cylinder is actuated.

In the construction as described above, in the case where the punch assembly 95 is heavy in particular, the operation handle 231 is switched from the position A to the position C to project the punch receive portion 81 beyond the rotary table 33. Thereafter, the punch assembly 95 is set to the punch receive portion 81 up side down. Upon the end of the setting of the punch assembly 95 to the punch receive portion 81, the operation handle 231 is switched from the position C to the position A to return the punch receive portion 81 to the original position and to insert the punch assembly 95 into the rotary table 33, so that it is possible to support the punch assembly 95 on the punch support device 93 on the rotary table 33.

Thereafter, the operation handle 231 is switched from the position A to the position B to project the punch cutting edge beyond the punch guide 99. Under these conditions, it is possible to grind the punch cutting edge in the same way as with the case of the afore-mentioned embodiment.

As described above, since the punch receive portion 81 is projected upward from the rotary table 33, it is possible to set the punch assembly 95 simply and quickly without need of any time and labor.

Further, the punch receive portions 81 of various sizes are prepared and selected according to the kinds and heights of the punch assemblies 95. Further, as the means for projecting the punch receive portion 81 beyond the rotary table 33, it is possible to actuate the push cylinder 219 and the lifter cylinder 227 simultaneously.

In the above-mentioned embodiments, when the upper surface of the die 163, in particular is ground, the die supporting jig 165 engaged with the engage members 97 as shown in FIGS. 12 and 14 are used. Instead of these engage members 97, it is also possible to use a die supporting jig 233 as shown in FIG. 19.

Figure 19:
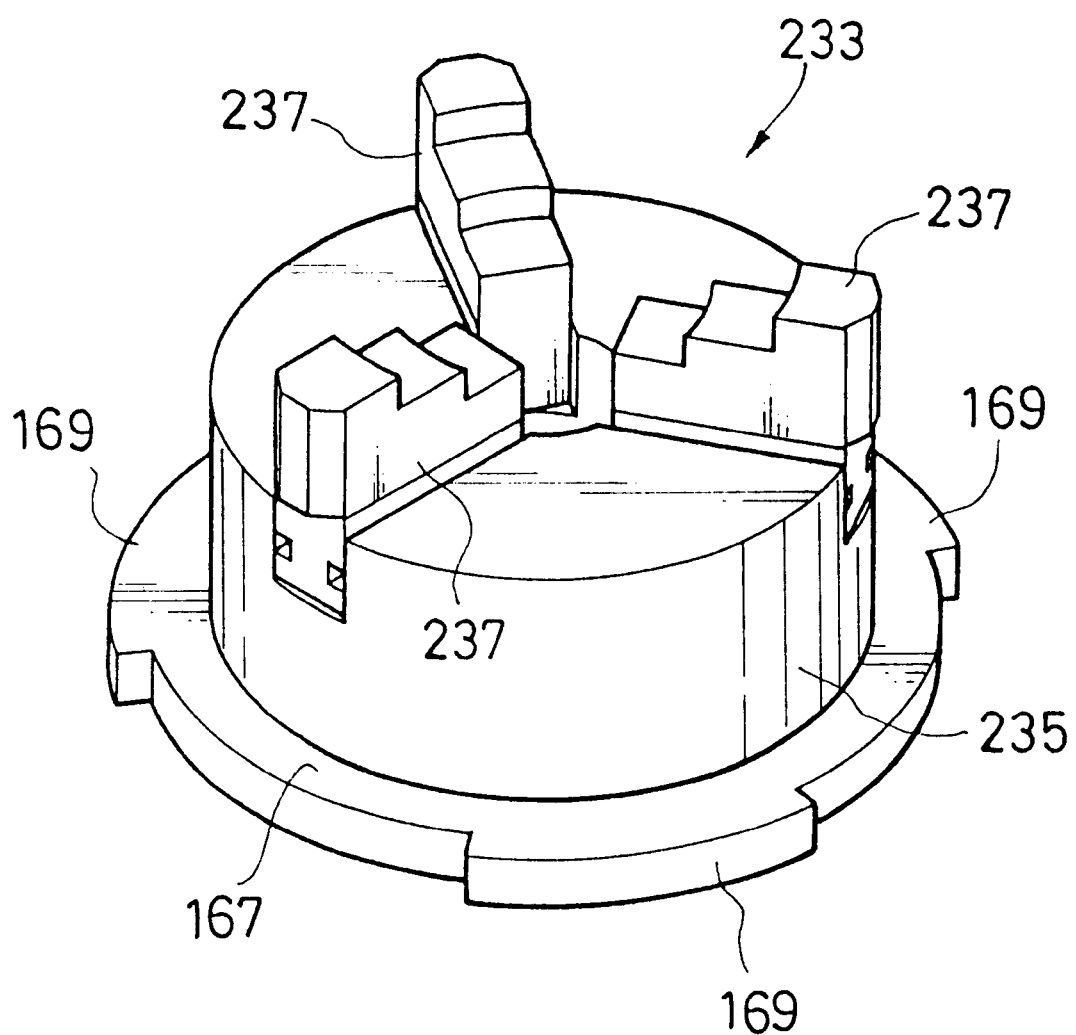
FIG. 19 is a perspective view showing another embodiment of the die supporting device for supporting the die.

In FIG. 19, a chuck body 235 is provided roughly at the central portion of the ring member 167 formed with a plurality of engage members 169. Further, the chuck body 235 is provided with a plurality of scroll chuck claws 237 movable and locatable in the radial direction thereof. Further, the respective scroll chuck claw is formed with a plurality of stepped portions of different heights.

In the construction as described above, when the scroll chuck claws 237 are moved in the radial direction, it is possible to support and fix the dies 163 of various sizes for grinding.

Figure 20:
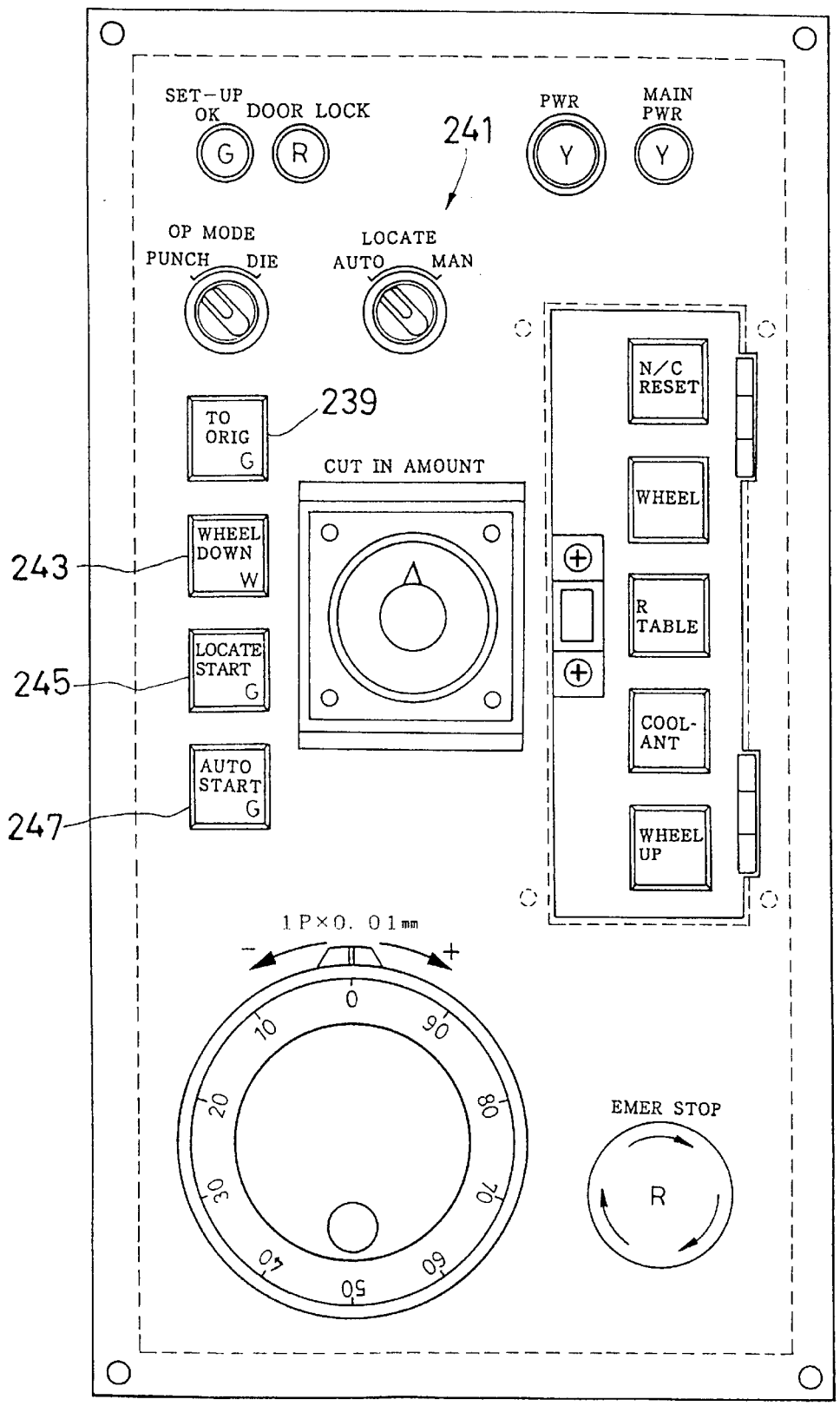
FIG. 20 is an enlarged front view showing an example of a console panel 23 shown in FIG. 18.

The control apparatus 201 as described with reference to FIG. 16 is connected to the console panel 23 shown in FIG. 2. FIG. 20 shows an example of the console panel 23 on which a number of switches are arranged.

In FIG. 20, when an original position restoring button (disposed on the upper left side) 239 is depressed, the cup-shaped grinding stone is lowered by 20 to 30 mm, for instance and then lifted automatically to detect an NC original position. In this original position restoring operation, since the cup- shaped grinding stone 53 can be located at the original position by a single depression of the switch, it is possible to reduce the number of buttons, as compared with when the stone 53 is first lowered and then lifted it to the NC original position by depressing two buttons.

Further, in this embodiment, the punch assembly 95 and the die 163 can be located automatically and further manually. In more detail, in FIG. 20, a locating switch 241 is provided at the upper portion of the panel, by which the automatic operation and the manual operation can be selectively switched.

In the manual locating operation, the locating switch 241 is first set to the manual position, and then a wheel-down button 243 is depressed to bring the cup-shaped grinding stone 53 close to the workpiece (the punch assembly 95 or the die 163) at high speed. Thereafter, the grinding stone 53 is moved manually by rotating a manual handle disposed on the console panel 23 shown in FIGS. 2 and 20. At the position when the cup-shaped grinding stone 53 is in contact with the workpiece, a locating start button 245 and an automatic start button 247 are depressed to start the automatic grinding operation. Further, in FIG. 20, the wheel-down button 243 is disposed under the original position restoring button 239; the locating start button 245 is disposed under the wheel-down button 243; and the automatic start button 247 is disposed under the location start button 245, respectively.

Further, without being limited to only the above-mentioned embodiments, the present invention can be modified appropriately.

As described above, in the tool grinding machine according to the present invention, it is possible to grind the punch cutting edge without disassembling the punch body from the punch assembly. Further, the edge portion of the upper surface shoulder portion of the die can be ground easily. Further, any punches and dies of different sizes can be ground easily by use of an appropriate jig. Furthermore, it is possible to realize an automatic grinding operation easily by selecting any one of previously stored operation modes for grinding the workpiece under different grinding conditions.

What is claimed is:

1. A tool grinding machine, comprising:

a rotary table disposed on a base having a frame;

a lift slider disposed vertically movably on the base, for rotatable supporting a grinding tool to grind a workpiece fitted to said rotary table;

a ball screw mounted on said frame, a nut secured to the lift slider and engaged with the ball screw for moving the slider up and down by rotation of the ball screw;

a hook attached to said lift sliders from which a workpiece to be exchanged is suspended;

a punch lift device to be hooked to the hook, the punch lift device including:

a semi-circular block holder, formed with a first semi-circular groove in the inner circumferential surface thereof, a first portion of a flange of a punch guide being fitted to the first semi-circular groove, and a semi-circular fastening holder formed with a second semi-circular groove, a second portion of said flange of the punch guide being fitted to the second semi-circular groove and a first end of the semi-circular fastening holder being pivotally supported by a pin on a first end of the semi-circular block holder.

2. The tool grinding machine of claim 1, wherein a fastening bolt is pivotally supported on the second end of the semi-circular block holder, and a U-shaped groove is formed at the second end of the semi-circular fastening holder.

* * * * *

UNITED STATES PATENT AND TRADEMARK OFFICE
CERTIFICATE OF CORRECTION

PATENT NO. : 5,961,379
DATED : October 5, 1999
INVENTOR(S) : Kazuyuki Uchida

It is certified that error appears in the above-identified patent and that said Letters Patent is hereby corrected as shown below:

Column 14, (claim 1), line 4, change "rotatable" to --rotatably--.

Column 14, (claim 1), line 10, change "sliders" to --slider,--.

Signed and Sealed this

Fourth Day of April, 2000

Attest:

Attesting Officer

Q. TODD DICKINSON

Director of Patents and Trademarks